US008753205B2

(12) United States Patent
Kando

(10) Patent No.: US 8,753,205 B2
(45) Date of Patent: Jun. 17, 2014

(54) COMPUTER-READABLE STORAGE MEDIUM HAVING GAME PROGRAM STORED THEREIN AND GAME APPARATUS FOR GENERATING A TWO-DIMENSIONAL GAME IMAGE REPRESENTING A THREE-DIMENSIONAL GAME SPACE

(75) Inventor: Yuji Kando, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1518 days.

(21) Appl. No.: 12/076,304

(22) Filed: Mar. 17, 2008

(65) Prior Publication Data

US 2009/0163274 A1  Jun. 25, 2009

(30) Foreign Application Priority Data

Dec. 21, 2007  (JP) ................... 2007-330101

(51) Int. Cl.
*A63F 9/24* (2006.01)
(52) U.S. Cl.
USPC .............. 463/33; 463/30; 463/31; 463/32; 463/34
(58) Field of Classification Search
USPC ....................................... 463/30–34
See application file for complete search history.

(56) References Cited

U.S. PATENT DOCUMENTS

| 5,736,982 A * | 4/1998 | Suzuki et al. ............. 715/706 |
| 6,241,609 B1 * | 6/2001 | Rutgers ..................... 463/31 |
| 6,335,731 B1 * | 1/2002 | Yamamoto ................. 345/420 |
| 6,424,353 B2 * | 7/2002 | Yamamoto et al. ......... 345/619 |
| 6,454,652 B2 * | 9/2002 | Miyamoto et al. .......... 463/31 |
| 2001/0049300 A1 * | 12/2001 | Okamoto et al. ........... 463/30 |
| 2003/0166413 A1 * | 9/2003 | Hayashida et al. ......... 463/30 |
| 2004/0224761 A1 * | 11/2004 | Nishimura ................. 463/33 |
| 2005/0266921 A1 * | 12/2005 | Hayashida et al. ......... 463/33 |
| 2007/0060228 A1 * | 3/2007 | Akasaka et al. ............ 463/1 |
| 2007/0202949 A1 * | 8/2007 | Kawade et al. ............. 463/32 |

FOREIGN PATENT DOCUMENTS

JP  2004-329463  11/2004

* cited by examiner

*Primary Examiner* — Ronald Laneau
*Assistant Examiner* — Justin Myhr
(74) *Attorney, Agent, or Firm* — Nixon & Vanderhye P.C.

(57) ABSTRACT

A computer-readable storage medium having stored therein a game program for generating a two-dimensional game image representing a state of a three-dimensional game space acquired by a virtual camera so as to display the two-dimensional game image by a display device, and the program is executed so as to calculate the number of pixels included in a linear distance to a target pixel representing a predetermined pixel on the two-dimensional game image, from a sight point pixel corresponding to a sight point of the virtual camera in the three-dimensional game space. Next, a movement rate of the virtual camera is set in accordance with the number of pixels having been calculated. The virtual camera is moved to a predetermined position in the three-dimensional game space in accordance with the movement rate having been set.

19 Claims, 21 Drawing Sheets

F I G. 7
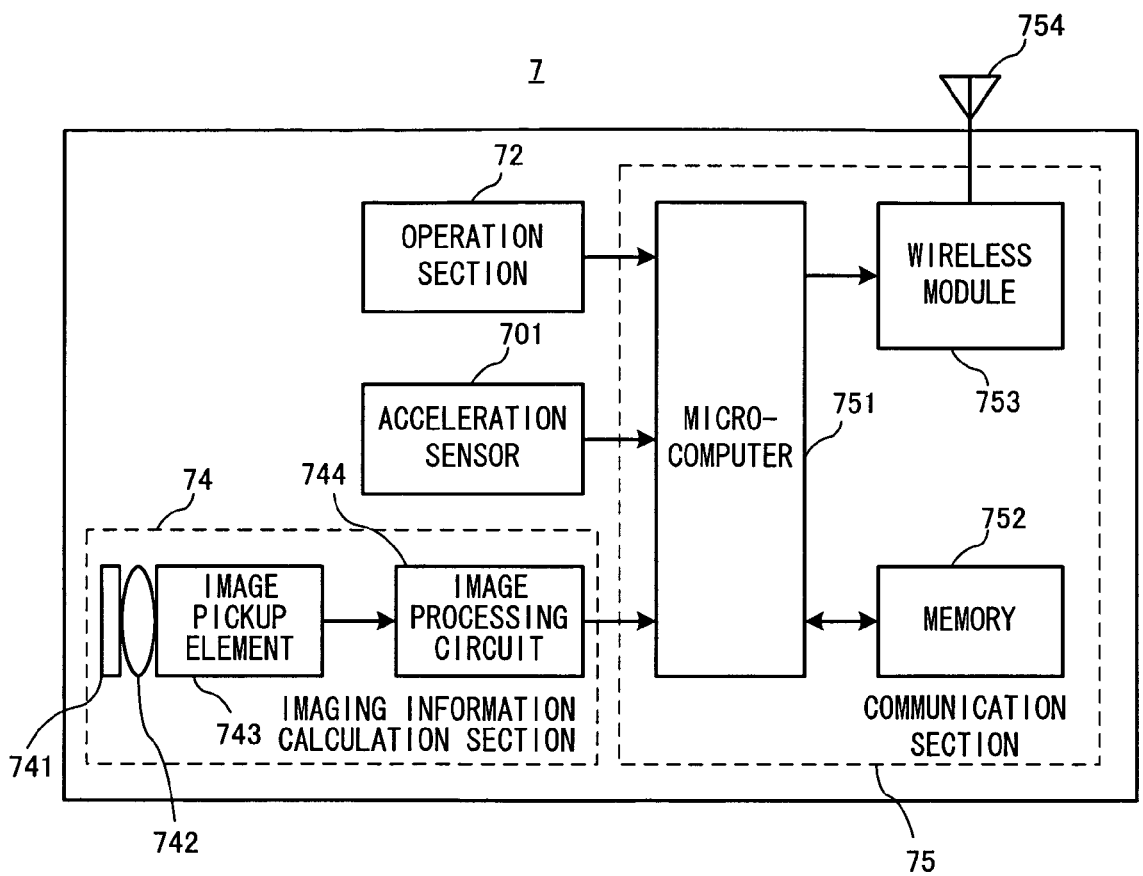

MOVING DIRECTION OF VIRTUAL CAMERA

COMPUTER-READABLE STORAGE MEDIUM HAVING GAME PROGRAM STORED THEREIN AND GAME APPARATUS FOR GENERATING A TWO-DIMENSIONAL GAME IMAGE REPRESENTING A THREE-DIMENSIONAL GAME SPACE

CROSS REFERENCE TO RELATED APPLICATION

The disclosure of Japanese Patent Application No. 2007-330101, filed on Dec. 21, 2007, is incorporated herein by reference.

TECHNICAL FIELD

Certain exemplary embodiments disclosed herein relate to a computer-readable storage medium having stored therein a game program for generating a two-dimensional game image representing a state of a three-dimensional game space acquired by a virtual camera, so as to display the two-dimensional game image by a display device, and more particularly to a movement of a virtual camera in a three-dimensional game space.

BACKGROUND AND SUMMARY

In recent years, computers included in game systems have become more sophisticated, and therefore a three-dimensional game using three-dimensional computer graphics technique is widespread. In the three-dimensional game, an object, such as a player object or a topography object, represented by a polygon is positioned in a three-dimensional game space, and a state of the game space is displayed as a three-dimensional game screen by using a predetermined point of view.

As one of game apparatuses which display the three-dimensional game screen described above, a game apparatus which allows a virtual camera to follow a movement of a player character is known (for example, Japanese Laid-Open Patent Publication No. 2004-329463 (hereinafter, referred to as Patent Document 1)). More specifically, in the aforementioned game, a character position at which the player character is positioned is set as a target position, and the virtual camera is moved at a speed based on a distance to the target position such that a position (sight point position) of a sight point of the virtual camera approaches the target position at a predetermined rate.

However, the game apparatus disclosed in Patent Document 1 has the following problems. Specifically, a complicated calculation (three-dimensional calculation) based on a three-dimensional game space needs to be performed so as to calculate a movement rate based on a distance to the target position. Therefore, there is a problem that processing load of the game apparatus is increased.

Therefore, a feature of certain exemplary embodiments is to provide a computer-readable storage medium having stored therein a game program and a game apparatus, the game program and the game apparatus enabling reduction of processing load for calculating a movement rate of a virtual camera.

Certain exemplary embodiments have the following aspects to attain the feature mentioned above. The reference numerals, supplementary descriptions, and the like in the parentheses indicate an exemplary correspondence with an exemplary embodiment described below so as to aid in understanding certain exemplary embodiments, and are not intended to be limiting in any way.

A first aspect of certain exemplary embodiments is directed to a computer-readable storage medium having stored therein a game program executed by a computer of a game apparatus for generating a two-dimensional game image representing a state of a three-dimensional game space acquired by a virtual camera so as to display the two-dimensional game image by a display device, and the game program causes the computer to function as: a-number-of-pixels calculation means (S41, S45 to S48); movement rate setting means (S28); and camera movement control means (S3). The-number-of-pixels calculation means calculates a number of pixels included in a linear distance to a target pixel representing a predetermined pixel on the two-dimensional game image, from a sight point pixel representing a pixel on the two-dimensional game image, the sight point pixel corresponding to a sight point of the virtual camera in the three-dimensional game space. The movement rate setting means sets a movement rate of the virtual camera in accordance with the number of pixels calculated by the-number-of-pixels calculation means. The camera movement control means moves the virtual camera to a predetermined position in the three-dimensional game space in accordance with the movement rate having been set by the movement rate setting means.

According to the first aspect, it is possible to set a movement rate of the virtual cameral based on a process of calculating the number of pixels for the two-dimensional game image. Therefore, the movement rate of the virtual camera can be determined without using a complicated calculation for a three-dimensional space, thereby reducing processing load of the computer.

In a second aspect based on the first aspect, the game program causes the computer to further function as: depth value storage means (S21); sight point depth value calculation means (S24); and target pixel detection means (S27, S29). The depth value storage means stores, in a predetermined storage section, a depth value representing a distance of an object displayed on the two-dimensional game image in a depth direction of the three-dimensional game space so as to associate a plurality of the depth values with pixels of the two-dimensional game image, respectively. The sight point depth value calculation means calculates a depth value of the sight point of the virtual camera in the three-dimensional game space. The target pixel detection means compares the depth value calculated by the sight point depth value calculation means with the depth value representing the distance of the object displayed on the two-dimensional game image so as to detect a position of the target pixel in accordance with a comparison result.

According to the second aspect, it is possible to detect a position of the target pixel by using the depth value. Therefore, it is possible to calculate the target pixel without using a complicated three-dimensional calculation, thereby reducing processing load.

In a third aspect based on the second aspect, the game program causes the computer to further function as obstacle determination means (S21 to S26). The obstacle determination means determines whether or not an obstacle is positioned, in the three-dimensional game space, on a straight line connecting between a point of view of the virtual camera and the sight point of the virtual camera. Further, the-number-of-pixels calculation means calculates the number of pixels included in the linear distance from the sight point pixel to the target pixel when the obstacle determination means determines that the obstacle is positioned.

According to the third aspect, when an object is hidden behind an obstacle and is not displayed in the three-dimensional game space, the movement rate of the virtual camera can be determined in accordance with the number of pixels between the target pixel and the sight point pixel.

In a fourth aspect based on the third aspect, the camera movement control means moves the virtual camera, in the three-dimensional game space, to a position, on the straight line connecting between the point of view of the virtual camera and the sight point thereof, at which no obstacle is positioned.

According to the fourth aspect, when an object (an object having the sight point set therein) is hidden behind an obstacle and is not displayed in the three-dimensional game space, the virtual camera is moved at the movement rate based on the number of pixels between the target pixel and the sight point pixel so as to display the object.

In a fifth aspect based on the fourth aspect, the-number-of-pixels calculation means calculates the number of pixels included in a straight line extending vertically upward from the sight point pixel to the target pixel in the two-dimensional game image. Further, the camera movement control means moves the virtual camera upward to a position, on the straight line connecting between the point of view of the virtual camera and the sight point thereof, at which no obstacle is positioned.

According to the fifth aspect, the virtual camera can be moved upward over the obstacle so as to follow the player object, thereby providing a player with a game screen which prevents the player from feeling uncomfortable.

In a sixth aspect based on the third aspect, the sight point is a predetermined point included in a player object representing a subject to be operated by a player.

According to the sixth aspect, it is possible to prevent the player object from being hidden behind the obstacle and being invisible.

In a seventh aspect based on the sixth aspect, the game program causes the computer to further function as projection position calculation means (S22), and depth value difference calculation means (S25). The projection position calculation means calculates a display position at which the player object is to be displayed in a coordinate system of the two-dimensional game image by using projective transformation. The depth value difference calculation means calculates a difference between the depth value calculated by the sight point depth value calculation means and a depth value of a pixel corresponding to a projection position. Further, the obstacle determination means determines that the obstacle is positioned when the difference calculated by the depth value difference calculation means represents a value greater than or equal to a predetermined value.

According to the seventh aspect, it is possible to determine, by using the depth value, whether or not the obstacle is positioned between the virtual camera and the player object having the sight point set therein, thereby reducing processing load of the computer.

In an eighth aspect based on the sixth aspect, the game program causes the computer to further function as distance difference calculation means (S25) for calculating, in the three-dimensional game space, a difference between a distance from the point of view of the virtual camera to the predetermined point included in the player object, and a distance from the point of view of the virtual camera to the obstacle positioned in a direction of the predetermined point included in the player object. Further, the obstacle determination means determines that the obstacle is positioned when the difference calculated by the distance difference calculation means represents a value greater than or equal to a predetermined value.

According to the eighth aspect, the difference between the distances in the three-dimensional game space is used to determine whether or not the obstacle is positioned between the virtual camera and the player object having the sight point set therein. Therefore, determination can be performed with enhanced accuracy.

In a ninth aspect based on the second aspect, the target pixel detection means detects a position of a pixel at which the depth value representing the distance of the object displayed on the two-dimensional game image represents a deeper position than the depth value calculated by the sight point depth value calculation means.

According to the ninth aspect, it is possible to detect a position of the target pixel by using the depth value. Therefore, it is possible to calculate the target pixel without using a complicated three-dimensional calculation, thereby reducing processing load.

In a tenth aspect based on the first aspect, the movement rate setting means sets the movement rate such that the greater the number of pixels calculated by the-number-of-pixels calculation means is, the higher the movement rate is.

According to the tenth aspect, when the moving distance of the virtual camera is long, the movement rate can be increased. When the moving distance of the virtual cameral is short, the movement rate can be reduced. Therefore, the virtual camera can be moved for a similar time period regardless of whether the moving distance of the virtual camera is long or short.

In an eleventh aspect based on the tenth aspect, the movement rate setting means includes acceleration calculation means for calculating a movement acceleration of the virtual camera in accordance with the number of pixels calculated by the-number-of-pixels calculation means. The movement rate setting means calculates and sets the movement rate by using the movement acceleration.

According to the eleventh aspect, an acceleration of the virtual camera is calculated based on the number of pixels having been calculated so as to move the virtual camera by using the acceleration having been calculated. Therefore, the virtual camera can be moved so as to change a game image in such a manner that a player does not feel uncomfortable.

In a twelfth aspect based on the eleventh aspect, the game program causes the computer to further function as: a-number-of-pixels-to-be-returned calculation means (S81, S86 to S89); and camera returning control means (S28). The-number-of-pixels-to-be-returned calculation means calculates a number of pixels included in a linear distance from the sight point pixel to a predetermined pixel, representing a return pixel, on the two-dimensional game image after the virtual camera has been moved by the camera movement control means in accordance with the movement rate based on the movement acceleration, and stops. The camera returning control means moves, when the number of pixels calculated by the-number-of-pixels-to-be-returned calculation means represents a value greater than or equal to a predetermined value, the virtual camera at a predetermined movement rate in a direction opposite to a moving direction in which the camera movement control means has moved the virtual camera.

According to the twelfth aspect, when the virtual camera is moved by using the acceleration, a position to which the virtual camera has been moved can be adjusted. Therefore, it is possible to provide a player with a game image which can be easily viewed by the player.

In a thirteenth aspect based on the twelfth aspect, the camera returning control means moves the virtual camera such that the greater the number of pixels calculated by the-number-of-pixels-to-be-returned calculation means is, the higher the predetermined movement rate for moving the virtual camera is.

According to the thirteenth aspect, when the moving distance of the virtual camera is long, the movement rate can be increased. When the moving distance of the virtual camera is short, the movement rate can be reduced. Therefore, the virtual camera can be moved for a similar time period regardless of whether the moving distance of the virtual camera is long or short.

In a fourteenth aspect based on the thirteenth aspect, the camera returning control means includes returning acceleration calculation means for calculating a movement acceleration of the virtual camera in accordance with the number of pixels calculated by the-number-of-pixels-to-be-returned calculation means. The camera returning control means moves the virtual camera at the predetermined movement rate based on the movement acceleration.

According to the fourteenth aspect, the virtual camera can be moved so as to change a game image in such a manner that a player does not feel uncomfortable.

A fifteenth aspect of certain exemplary embodiments is directed to a game apparatus for generating a two-dimensional game image representing a state of a three-dimensional game space acquired by a virtual camera so as to display the two-dimensional game image by a display device, and the game apparatus comprises: a-number-of-pixels calculation means; movement rate setting means; and camera movement control means. The-number-of-pixels calculation means calculates a number of pixels included in a linear distance to a target pixel representing a predetermined pixel on the two-dimensional game image, from a sight point pixel representing a pixel on the two-dimensional game image, the sight point pixel corresponding to a sight point of the virtual camera in the three-dimensional game space. The movement rate setting means sets a movement rate of the virtual camera in accordance with the number of pixels calculated by the-number-of-pixels calculation means. The camera movement control means moves the virtual camera to a predetermined position in the three-dimensional game space in accordance with the movement rate having been set by the movement rate setting means.

According to the fifteenth aspect, the same effect as that for the first aspect can be obtained.

According to certain exemplary embodiments, the movement rate of the virtual camera can be determined by using calculation based on a two-dimensional image, thereby enabling reduction of processing load of the CPU and the like. Therefore, even a game apparatus using the CPU and the like which operate at a slow processing speed can process a three-dimensional game which can be easily operated by a player, and provides a screen which is easily viewed by the player.

These and other features, aspects and advantages of certain exemplary embodiments will become more apparent from the following detailed description when taken in conjunction with the accompanying drawings.

BRIEF DESCRIPTION OF THE DRAWINGS

FIG. 7 is a block diagram illustrating a structure of the controller 7 shown in FIG. 3;

DETAILED DESCRIPTION

Hereinafter, an exemplary embodiment will be described with reference to the drawings. This exemplary embodiment is not intended to be limiting.

(Entire Structure of Game System)

Figure 1:
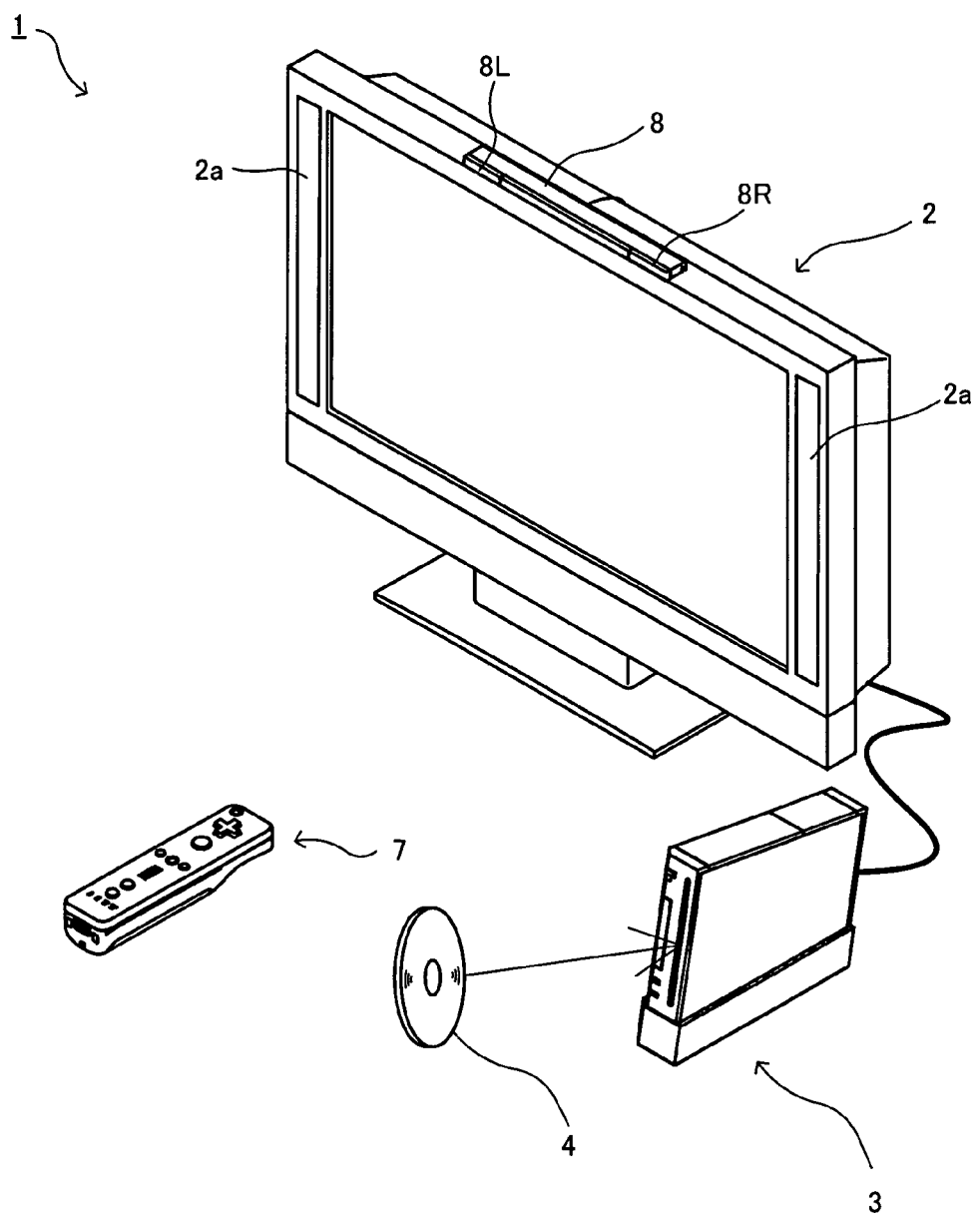
FIG. 1 is an external view illustrating a game system 1 according to an exemplary embodiment.

With reference to FIG. 1, a game system 1 including a game apparatus according to an exemplary embodiment will be described. FIG. 1 is an external view illustrating the game system 1. Hereinafter, a game apparatus and a game program according to this exemplary embodiment will be described by using a stationary game apparatus as an example. As shown in FIG. 1, the game system 1 includes a television receiver (hereinafter, referred to simply as a "television set") 2, a game apparatus body 3, an optical disc 4, a controller 7, and a marker section 8. The system according to this exemplary embodiment allows the game apparatus body 3 to execute game processing based on a game played using the controller 7.

Into the game apparatus body 3, the optical disc 4, which typifies an information storage medium and is exchangeable with respect to the game apparatus body 3, is detachably inserted. In the optical disc 4, the game program executed by the game apparatus body 3 is stored. The game apparatus body 3 has, on the front surface thereof, an opening through which the optical disc 4 is inserted. The game apparatus body 3 executes the game processing by reading and executing the game program stored in the optical disc 4 which is inserted in the game apparatus body 3 through the opening.

The game apparatus body 3 is connected through a connection cord to the television set 2 typifying a display device. The television set 2 displays a game image generated through the game processing executed by the game apparatus body 3. Further, the marker section 8 is provided in the vicinity of the screen of the television set 2 (on the top surface of a screen of the television set 2 in FIG. 1). The marker section 8 includes two markers, a marker 8R and a marker 8L, at both ends thereof. Specifically, each of the markers 8R and 8L includes at least one infrared LED, and emits an infrared light forward from the television set 2. The marker section 8 is connected to the game apparatus body 3, and the game apparatus body 3 is capable of controlling each infrared LED included in the marker section 8 so as to be lit up.

The controller 7 is an input device for supplying, to the game apparatus body 3, operation data representing a content of an operation performed on the controller 7. The controller 7 is connected to the game apparatus body 3 by wireless communication. In this exemplary embodiment, for example, the Bluetooth (registered trademark) technology is used for the wireless communication between the controller 7 and the game apparatus body 3. In another exemplary embodiment, the controller 7 and the game apparatus body 3 may communicate with each other by a wired connection.

(Internal Structure of Game Apparatus Body 3)

Figure 2:
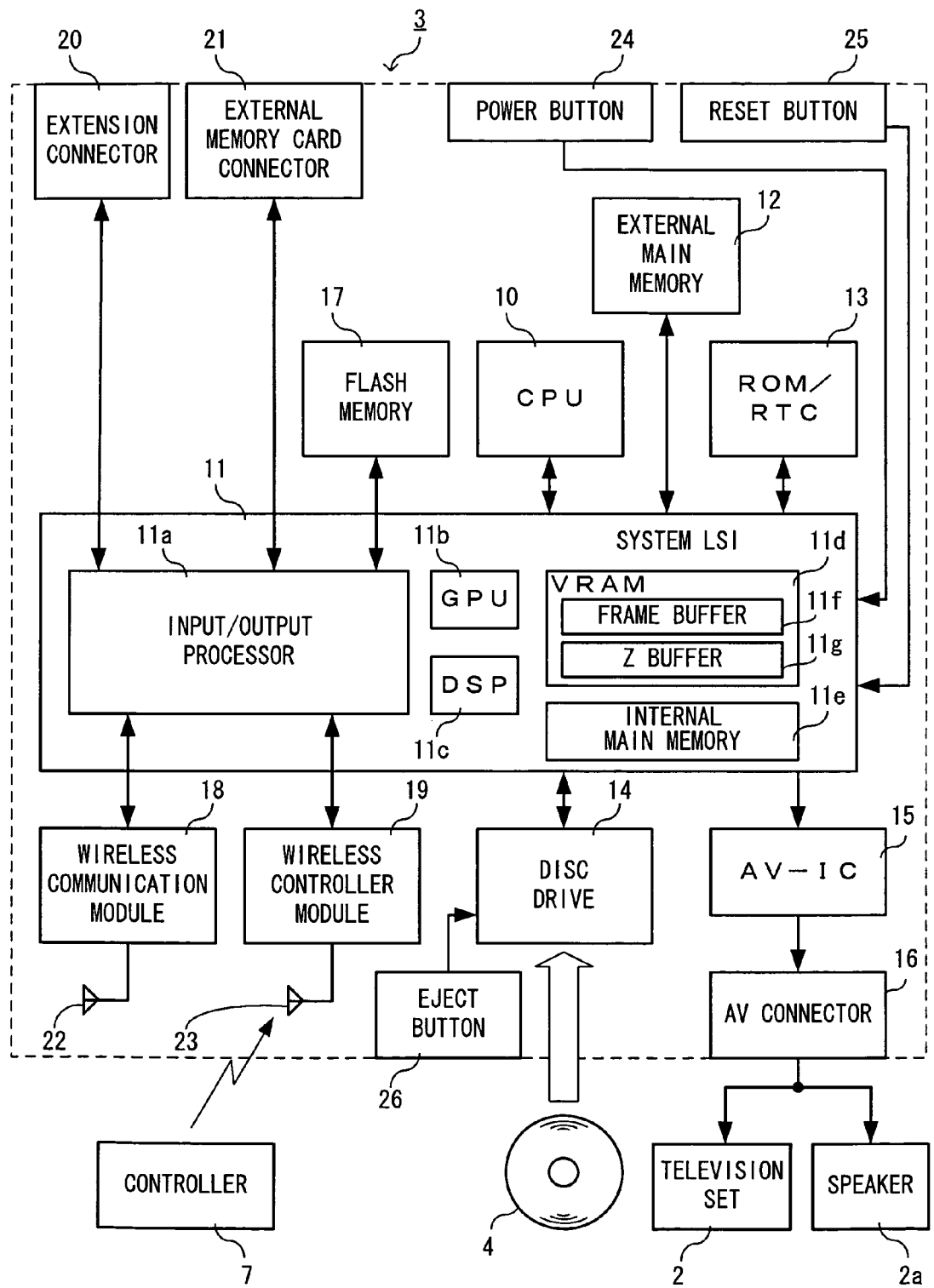
FIG. 2 is a functional block diagram of a game apparatus body 3 shown in FIG. 1.

Next, with reference to FIG. 2, an internal structure of the game apparatus body 3 will be described. FIG. 2 is a block diagram illustrating a structure of the game apparatus body 3. The game apparatus body 3 includes: the CPU 10; a system LSI 11; an external main memory 12; a ROM/RTC 13; a disc drive 14; an AV-IC 15, and the like.

The CPU 10, serving as a game processor, executes the game program stored in the optical disc 4 so as to perform the game processing. The CPU 10 is connected to the system LSI 11. In addition to the CPU 10, the external main memory 12, the ROM/RTC 13, the disc drive 14, and the AV-IC 15 are also connected to the system LSI 11. The system LSI 11 performs processing such as control of data transmission between respective components connected thereto, generation of an image to be displayed, and acquisition of data from an external apparatus. An internal structure of the system LSI will be described below. The external main memory 12, which is of a volatile type, stores programs, such as a game program loaded from the optical disc 4 or a flash memory 17, and various data, and is used as a work area and a buffer area for the CPU 10. The ROM/RTC 13 includes a ROM (so-called a boot ROM) incorporating a program for booting the game apparatus body 3, and a clock circuit (RTC: real time clock) for counting time.

The disc drive 14 reads, from the optical disc 4, program data, texture data and the like, and writes the read data into an internal main memory 11e described below or the external main memory 12.

Provided in the system LSI 11 are an input/output processor (I/O processor) 11a, a GPU (graphics processor unit) 11b, a DSP (digital signal processor) 11c, a VRAM 11d, and the internal main memory 11e. These component 11a, 11b, 11c, 11d and 11e are connected to each other via an internal bus not shown.

The GPU 11b, which is a part of rendering means, generates an image in accordance with a graphics command (draw command) supplied from the CPU 10. More specifically, the GPU 11b performs a calculation process necessary for displaying 3D graphics in accordance with the graphics command, such as a process of transforming a 3D coordinate to a 2D coordinate, which corresponds to a preprocessing for rendering, and a final rendering process such as texture mapping, thereby generating game image data. The CPU 10 supplies, to the GPU 11b, a command based on an image generation program necessary for generating the game image data in addition to the graphics command.

The VRAM 11d, including a frame buffer 11f and a Z buffer 11g, stores data (such as polygon data and texture data) necessary for the GPU 11b to execute the graphics command. When an image is generated, the GPU 11b generates image data by using the data stored in the VRAM 11d.

The frame buffer 11f is, for example, a memory in which image data for one frame of the television set 2 is rendered (stored), and is updated for each frame by the GPU 11b. The AV-IC 15 described below reads data from the frame buffer 11f so as to display a 3D game image on the screen of the television set 2.

Further, the Z buffer 11g has a storage capacity for storing (the number of pixels (storage location or address) of the frame buffer 11f)×(the number of bits of depth data of one pixel), and stores depth information or depth data (Z value) of a dot corresponding to each storage location of the frame buffer 11f.

The DSP 11c functions as an audio processor, and generates audio data by using sound data and sound waveform (tone quality) data stored in the internal main memory 11e and the external main memory 12. The internal main memory 11e stores a program and various data, and is used as a work area and a buffer area for the CPU 10, as with the external main memory 12.

The image data and the audio data generated as described above, are read by the AV-IC 15. The AV-IC 15 outputs the read image data to the television set 2 via an AV connector 16, and also outputs the read audio data to a speaker 2a of the television set 2. Thus, an image is displayed on the television set 2, and a sound is outputted from the speaker 2a.

The I/O processor 11a executes data reception and transmission among the components connected thereto and download of data from an external apparatus. The I/O processor 11a is connected to the flash memory 17, a wireless communication module 18, a wireless controller module 19, an extension connector 20, and an external memory card connector 21. To the wireless communication module 18, an antenna 22 is connected, and to the wireless controller module 19, an antenna 23 is connected.

The I/O processor 11a is connected to a network via the wireless communication module 18 and the antenna 22 so as to communicate with other game apparatuses or various servers connected to the network. The I/O processor 11a accesses the flash memory 17 at regular time intervals so as to detect for data to be transmitted to the network. When the data to be transmitted is detected, the data is transmitted to the network via the wireless communication module 18 and the antenna 22. Further, the I/O processor 11a receives, via the network, the antenna 22 and the wireless communication module 18, data transmitted from the other game apparatuses or data downloaded from a download server, and stores the received data in the flash memory 17. The CPU 10 executes the game program so as to read the data stored in the flash memory 17, thereby using the read data on the game program. The flash memory 17 may store not only the data transmitted and received among the game apparatus body 3, and other game apparatuses or the various servers, but also saved data (result data or intermediate step data of the game) of a game played with the game apparatus body 3.

Further, the I/O processor 11a receives the operation data transmitted from the controller 7 via the antenna 23 and the wireless controller module 19, and (temporarily) stores the operation data in a buffer area of the internal main memory 11e or the external main memory 12.

Further, the I/O processor 11a is connected to the extension connector 20 and the external memory card connector 21. The extension connector 20, which is a connector used for interface such as a USB and an SCSI, allows communication with the network, without using the wireless communication module 18, by connecting, to the extension connector 20, a media such as an external storage medium, or a peripheral device such as another controller, or a wired communication connector. The external memory card connector 21 is a connector for connecting to the external memory card connector 21 the external storage medium such as a memory card. For example, the I/O processor 11a accesses the external storage medium via the extension connector 20 or the external memory card connector 21, so as to store data in the external storage medium or read data from the external storage medium.

The game apparatus body 3 includes a power button 24, a reset button 25, and an eject button 26. The power button 24 and the reset button 25 are connected to the system LSI 11. When the power button 24 is pressed so as to be ON, the power is supplied to the respective components of the game apparatus body 3 via an AC adapter which is not shown. Further, when the power button 24, which is ON, is pressed again, the game apparatus body 3 shifts to a low power standby mode. Also in this state, power is being supplied to the game apparatus body 3, and therefore the game apparatus body 3 continues to be connected to the network such as the Internet. When the power supply, which is ON, is to be OFF, the power supply can be OFF by pressing the power button 24 for a predetermined time period or longer period. When the reset button 25 is pressed, the system LSI 11 restarts a boot program of the game apparatus body 3. The eject button 26 is connected to the disc drive 14. When the eject button 26 is pressed, the optical disc 4 is ejected from the disc drive 14.

Figure 3:
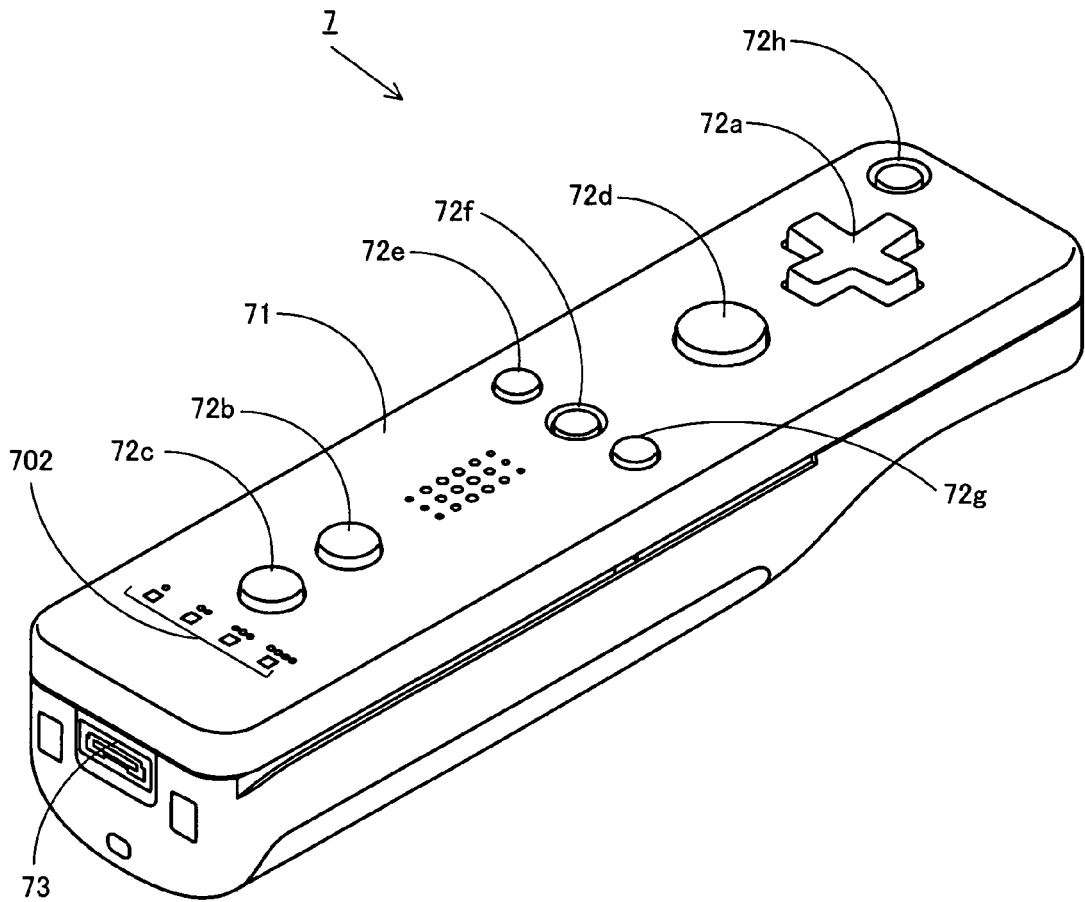
FIG. 3 is a perspective view of a controller 7 shown in FIG. 1 as viewed from the top rear side thereof.
Figure 3:
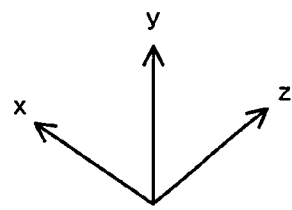
Figure 4:
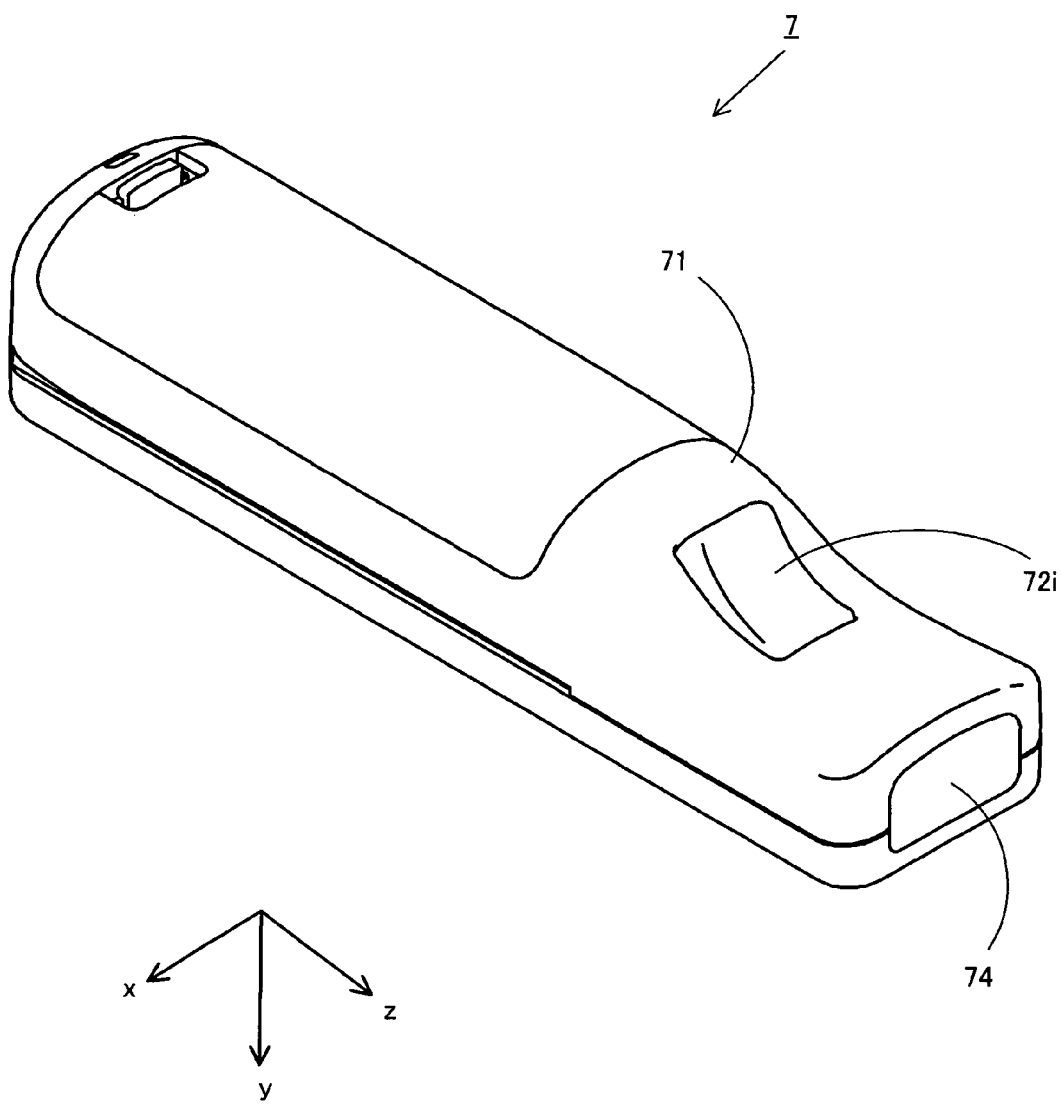
FIG. 4 is a perspective view of the controller 7 shown in FIG. 3 as viewed from the bottom front side thereof.

With reference to FIGS. 3 to 4, the controller 7 will be described. FIG. 3 is a perspective view of the controller 7 as viewed from the top rear side thereof. FIG. 4 is a perspective view of the controller 7 as viewed from the bottom front side thereof As shown in FIGS. 3 and 4, the controller 7 includes a housing 71, and an operation section 72, having a plurality of operation buttons, provided on a surface of the housing 71. The housing 71 of this exemplary embodiment has a generally parallelepiped shape extending in a longitudinal direction from front to rear. The overall size of the housing 71 is small enough to be held by one hand of an adult or even a child, and the housing 71 is formed by, for example, plastic molding.

At the center of the front portion of the top surface of the housing 71, a cross key 72a is provided. The cross key 72a is a cross-shaped four-direction push switch. The cross key 72a includes operation portions corresponding to the four directions (front, rear, right and left), which are located on cross-shaped projecting portions, respectively, arranged at intervals of 90 degrees. A player selects one of the front, rear, right and left directions by pressing a corresponding one of the operation portions of the cross key 72a. Through an operation on the cross key 72a, the player can, for example, indicate a direction in which a player character or the like appearing in a virtual game world is to move or select one of a plurality of options.

Although the cross key 72a is an operation section for outputting an operation signal in accordance with the aforementioned direction input operation performed by the player, such an operation section may be provided in another form. For example, the cross key 72a may be replaced with an operation section, including four push switches corresponding to directions, respectively, represented by a cross, for outputting an operation signal in accordance with the push switch having been pressed by the player. Alternatively, the cross key 72a may be replaced with an operation section including the aforementioned four push switches and a center switch provided at the center of the cross formed by the four push switches. Alternatively, the cross key 72a may be replaced with an operation section which includes an inclinable stick (so-called a joystick) projecting from the top surface of the housing 71 and outputs an operation signal in accordance with the inclining direction of the stick. Still alternatively, the cross key 72a may be replaced with an operation section which includes a disc-shaped member horizontally slidable and outputs an operation signal in accordance with the sliding direction of the disc-shaped member. Still alternatively, the cross key 72a may be replaced with a touch pad.

Behind the cross key 72a on the top surface of the housing 71, a plurality of operation buttons 72b, 72c, 72d, 72e, 72f and 72g are provided. The operation buttons 72b, 72c, 72d, 72e, 72f and 72g are operation sections for outputting operation signals assigned to the operation buttons 72b, 72c, 72d, 72e, 72f and 72g, respectively, when the player presses a head thereof. For example, the operation buttons 72b, 72c, and 72d are assigned with functions of a first button, a second button, and an A button, for example. Further, the operation buttons 72e, 72f and 72g are assigned with functions of a minus button, a home button and a plus button, for example. The operation buttons 72a, 72b, 72c, 72d, 72e, 72f and 72g are assigned with various operation functions in accordance with the game program executed by the game apparatus body 3. In an exemplary arrangement shown in FIG. 3, the operation buttons 72b, 72c and 72d are arranged in a line at the center in the front-rear direction on the top surface of the housing 71. The operation buttons 72e, 72f and 72g are arranged in a line in the left-right direction between the operation buttons 72b and 72d on the top surface of the housing 71. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for remote-controlling the power of the game apparatus body 3 to be on or off. The operation button 72h also has a top surface thereof buried in the top surface of the housing 71, so as not to be inadvertently pressed by the player.

Behind the operation button 72c on the top surface of the housing 71, a plurality of LEDs 702 are provided. The controller 7 is assigned a controller type (number) so as to be distinguishable from the other controllers 7. For example, the LEDs 702 are used for informing the player of the controller type which is currently set to controller 7 that he or she is using. Specifically, when the controller 7 transmits transmission data to the game apparatus body 3, one of the plurality of LEDs 702 is lit up so as to correspond to the controller type.

On the top surface of the housing 71, a sound hole for outputting a sound from a speaker (speaker 706 shown in FIG. 5) described below is formed between the operation button 72b and the operation buttons 72e, 72f, and 72g.

On the bottom surface of the housing 71, a recessed portion is formed. As described below in detail, the recessed portion is formed at a position at which an index finger or middle finger of a player is located when the player holds the controller 7 with one hand so as to orient the front surface thereof to the markers 8L and 8R. On a slope surface of the recessed portion on the bottom surface of the housing 71, an operation button 72i is provided. The operation button 72i is an operation section acting as, for example, a B button.

On the front surface of the housing 71, an image pickup element 743 included in the imaging information calculation section 74 is provided. The imaging information calculation section 74 is a system for analyzing image data taken by the controller 7 and detecting the position of the center of gravity, the size and the like of an area having a high brightness in the image data. The imaging information calculation section 74 has, for example, a maximum sampling period of about 200 frames/sec., and therefore can trace and analyze even a relatively fast motion of the controller 7. The imaging information calculation section 74 will be described below in detail. On the rear surface of the housing 71, the connector 73 is provided. The connector 73 is, for example, an edge connector, and is used for engaging and connecting the controller 7 with, for example, the connection cable.

Here, for giving specific description, a coordinate system is defined for the controller 7. As shown in FIGS. 3 and 4, xyz-axes orthogonal to each other are defined for the controller 7. Specifically, the z-axis is defined along the longitudinal direction of the housing 71 corresponding to the front-rear direction of the controller 7, and the direction toward the front surface (the surface on which the imaging information calculation section 74 is provided) of the controller 7 is defined as the z-axis positive direction. The y-axis is defined along the top-bottom direction of the controller 7, and the direction toward the top surface (the surface on which the operation button 72a and the like are provided) of the housing 71 is defined as the y-axis positive direction. The x-axis is defined along the right-left direction of the controller 7, and the direction toward the left side surface (the side surface shown in FIG. 4 but not shown in FIG. 3) of the housing 71 is defined as the x-axis positive direction.

Figure 5:
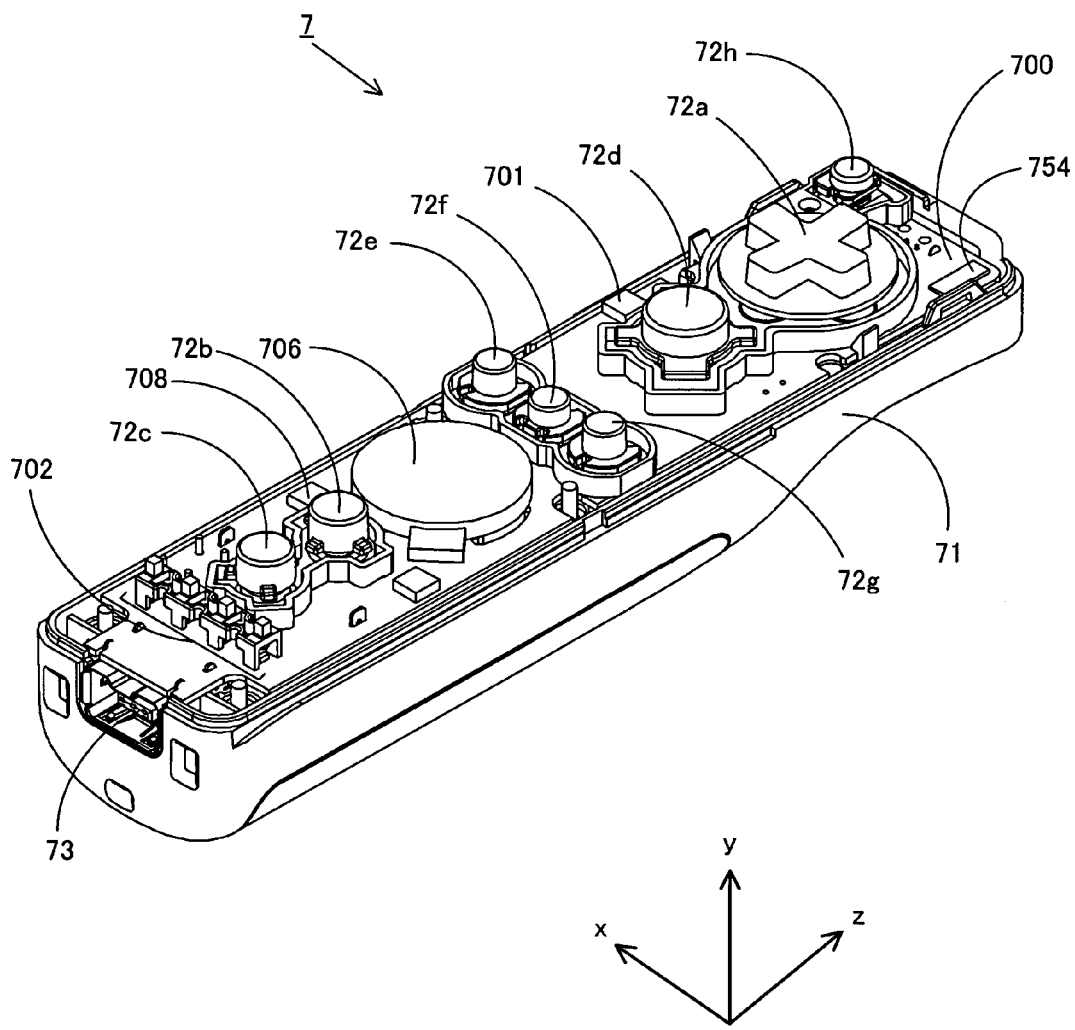
FIG. 5 is a perspective view illustrating a state where an upper housing of the controller 7 shown in FIG. 3 is removed.
Figure 6:
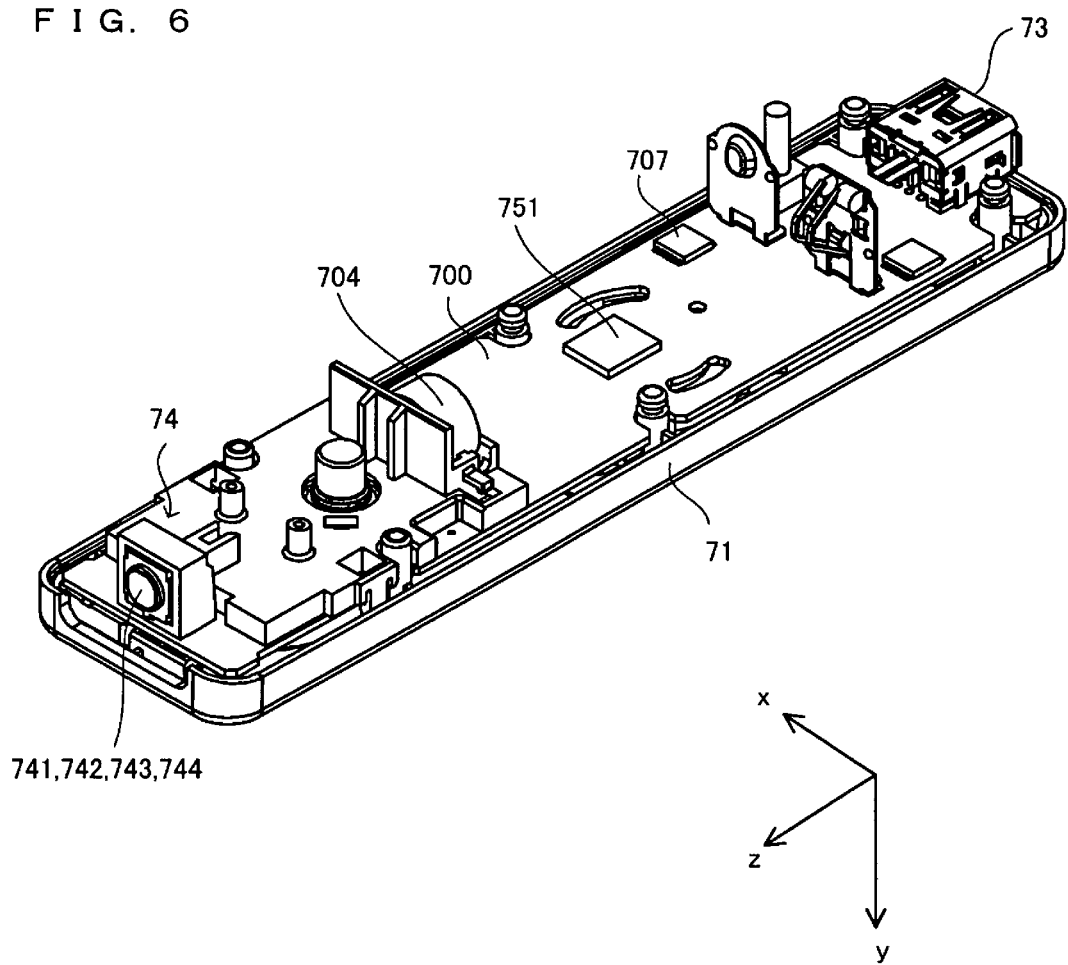
FIG. 6 is a perspective view illustrating a state where a lower housing of the controller 7 shown in FIG. 3 is removed.

With reference to FIGS. 5 and 6, an internal structure of the controller 7 will be described. FIG. 5 is a perspective view illustrating a state where an upper housing (a part of the housing 71) of the controller 7 is removed, as viewed from the rear surface side of the controller 7. FIG. 6 is a perspective view illustrating a state where a lower housing (a part of the housing 71) of the controller 7 is removed, as viewed from the front surface side of the controller 7. FIG. 6 is a perspective view illustrating a reverse side of a substrate 700 shown in FIG. 5.

As shown in FIG. 5, the substrate 700 is fixed inside the housing 71. On the top main surface of the substrate 700, the operation buttons 72a, 72b, 72c, 72d, 72e, 72f, 72g and 72h, an acceleration sensor 701, the LEDs 702, an antenna 754 and the like are provided. These elements are connected to a microcomputer 751 (see FIGS. 6 and 7) and the like via lines (not shown) formed on the substrate 700 and the like. The microcomputer 751 is exemplary button data generation means of the certain exemplary embodiments, and functions so as to generate operation button data in accordance with the operation button, such as the operation button 72a, having been pressed. This well-known mechanism is realized by, for example, the microcomputer 751 determining whether a wiring is connected or disconnected by using a switch mechanism including a tact switch positioned under a key top, or the like. More specifically, when a wiring is connected and energized by, for example, pressing an operation button, the microcomputer 751 determines the operation button connected to the energized wiring so as to generate a signal in accordance with the operation button having been pressed.

The wireless module 753 (see FIG. 7) and the antenna 754 allow the controller 7 to act as a wireless controller. A quartz oscillator (not shown), provided in the housing 71, generates a reference clock of the microcomputer 751 described below. On the top main surface of the substrate 700, the speaker 706 and an amplifier 708 are provided. The acceleration sensor 701 is provided to the left of the operation button 72d on the substrate 700 (that is, provided not at the center portion of the substrate 700 but near the periphery of the substrate 700). Accordingly, the acceleration sensor 701 is allowed to detect for both a direction change of the gravitational acceleration and an acceleration containing a component generated due to centrifugal force, in accordance with the controller 7 rotating about the longitudinal direction thereof. Therefore, by performing a predetermined calculation, the game apparatus body 3 or the like is allowed to determine the rotation of the controller 7, with preferable accuracy, based on the acceleration data having been detected.

As shown in FIG. 6, at the front edge of the bottom main surface of the substrate 700, the imaging information calculation section 74 is provided. The imaging information calculation section 74 includes an infrared filter 741, a lens 742, the image pickup element 743 and an image processing circuit 744 located in order, respectively, from the front surface of the controller 7 on the bottom main surface of the substrate 700. At the rear edge of the bottom main surface of the substrate 700, the connector 73 is attached. On the bottom main surface of the substrate 700, a sound IC 707 and the microcomputer 751 are provided. The sound IC 707 is connected to the microcomputer 751 and the amplifier 708 via a wiring formed on the substrate 700 and the like, and outputs an audio signal to the speaker 706 via the amplifier 708 in accordance with sound data transmitted from the game apparatus body 3.

On the bottom main surface of the substrate 700, a vibrator 704 is provided. The vibrator 704 may be, for example, a vibration motor or a solenoid. The vibrator 704 is connected to the microcomputer 751 by a wiring formed on the substrate 700 or the like, and is controlled so as to be ON/OFF in accordance with vibration data transmitted from the game apparatus body 3. The controller 7 is vibrated by an actuation of the vibrator 704, and the vibration is conveyed to the player's hand holding the controller 7. Thus, a so-called vibration-feedback game is realized. The vibrator 704 is positioned slightly in front of the longitudinal center of the housing 71, and therefore a vibration of the housing 71 is enhanced so as to allow a player holding the controller 7 to easily feel the controller 7 vibrating.

With reference to FIG. 7, the internal structure of the controller 7 will be described. FIG. 7 is a block diagram illustrating the structure of the controller 7.

As shown in FIG. 7, the controller 7 includes a communication section 75 in addition to the operation section 72, the imaging information calculation section 74, the acceleration sensor 701, the vibrator 704, the speaker 706, the sound IC 707, and the amplifier 708, which are described above.

The imaging information calculation section 74 includes the infrared filter 741, the lens 742, the image pickup element 743 and the image processing circuit 744. The infrared filter 741 allows only infrared light to pass therethrough, among light incident on the front surface of the controller 7. The lens 742 collects the infrared light which has passed through the infrared filter 741 and outputs the infrared light to the image pickup element 743. The image pickup element 743 is a solid-state image pick-up device such as, for example, a CMOS sensor or a CCD. The image pickup element 743 takes an image of the infrared light collected by the lens 742. Accordingly, the image pickup element 743 takes an image of only the infrared light which has passed through the infrared filter 741 and generates image data. The image data generated by the image pickup element 743 is processed by the image processing circuit 744. Specifically, the image processing circuit 744 processes the image data obtained from the image pickup element 743, identifies a spot thereof having a high brightness, and outputs, to the communication section 75, process result data representing a position coordinate point and the area size of the identified spot. The imaging information calculation section 74 is fixed to the housing 71 of the controller 7. The imaging direction of the imaging information calculation section 74 can be changed by changing the direction of the housing 71. As is apparent from the below description, a signal corresponding to a position and/or a movement of the controller 7 can be obtained based on the process result data outputted by the imaging information calculation section 74.

The controller 7 preferably includes a three-axis (x-axis, y-axis, and z-axis) acceleration sensor 701. The three-axis acceleration sensor 701 detects a linear acceleration in three directions, i.e., the up/down direction, the left/right direction, and the forward/backward direction. Further, in another exemplary embodiment, a two-axis acceleration detection means which detects for only a linear acceleration along each of the up/down and left/right directions (or other pair of directions) may be used depending on the type of control signals used in the game process. For example, the three-axis or two-axis acceleration sensor 701 may be of the type available from Analog Devices, Inc. or STMicroelectronics N.V. The acceleration sensor 701 may be of an electrostatic capacitance (capacitance-coupling) type that is based on silicon micro-machined MEMS (Micro Electro Mechanical Systems) technology. However, an acceleration detection technology (e.g., piezoelectric type or piezoresistance type) now existing or any other suitable technology later developed may be used to provide the three-axis or two-axis acceleration sensor 701.

As one skilled in the art understands, the acceleration detection means, as used in the acceleration sensor 701, are capable of detecting for only an acceleration (linear acceleration) along a straight line corresponding to each axis of the acceleration sensor. In other words, the direct output of the acceleration sensor 701 is limited to signals indicative of linear acceleration (static or dynamic) along each of the two or three axes thereof. As a result, the acceleration sensor 701 cannot directly detect movement along a non-linear (e.g. arcuate) path, rotation, rotational movement, angular displacement, tilt, position, attitude or any other physical characteristic.

However, when a computer such as a processor (for example, the CPU 10) of a game apparatus or a processor (for example, the microcomputer 751) of the controller performs a process based on a signal of an acceleration outputted by the acceleration sensor 701, additional information relating to the controller 7 can be inferred or calculated (determined), as one skilled in the art will readily understand from the description herein. For example, a case where the computer will perform a process assuming that a controller including the acceleration sensor is in a static state (that is, a case where it is anticipated that an acceleration detected by the acceleration sensor will include only a gravitational acceleration) will be described. When the controller is actually in the static state, it is possible to determine whether or not the controller tilts relative to the gravity direction and to also determine a degree of the tilt, based on the acceleration having been detected. Specifically, when a state where 1G (gravitational acceleration) is applied to a detection axis of the acceleration sensor in the vertically downward direction represents a reference, it is possible to determine whether or not the controller tilts relative to the vertically downward direction, based on only whether or not 1G is applied in the direction of the detection axis of the acceleration sensor. Further, it is possible to determine a degree to which the controller tilts relative to the vertically downward direction, based on a magnitude of the acceleration applied in the direction of the detection axis. Further, the acceleration sensor capable of detecting an acceleration in multiaxial directions subjects, to a processing, the acceleration signals having been detected in the respective axes so as to more specifically determine the degree to which the controller tilts relative to the gravity direction. In this case, although the processor may calculate, based on the output from the acceleration sensor 701, data representing an angle at which the controller 7 tilts, an approximate degree to which the controller 7 tilts may be inferred based on the output from the acceleration sensor 701 without calculating the data representing the angle of the tilt. Thus, when the acceleration sensor 701 is used in combination with the processor, the tilt, attitude, or position of the controller 7 can be determined. On the other hand, in a case where it is anticipated that the acceleration sensor will be in a dynamic state, the acceleration sensor detects an acceleration based on a movement of the acceleration sensor, in addition to the gravitational acceleration component. Therefore, when the gravitational acceleration component is eliminated through a predetermined process, it is possible to determine, for example, a direction in which the controller 7 moves. Specifically, when the controller 7 including the acceleration sensor 701 is dynamically accelerated and moved with a hand of a user, it is possible to calculate various movements and/or positions of the controller 7 by processing the acceleration signals generated by the acceleration sensor 701. Even when it is anticipated that the acceleration sensor will be in the dynamic state, the acceleration based on the movement of the acceleration sensor is eliminated through a predetermined process, whereby it is possible to determine the tilt of the controller 7 relative to the gravity direction. In another exemplary embodiment, the acceleration sensor 701 may include an embedded signal processor or another type of dedicated processor for performing any desired processing of the acceleration signals outputted by embedded acceleration detection means prior to outputting signals to the microcomputer 751. For example, when the acceleration sensor is intended to detect static acceleration (for example, gravitational acceleration), the embedded or dedicated processor could convert the detected acceleration signal to a corresponding tilt angle (or another preferable parameter).

In another exemplary embodiment, a gyro-sensor incorporating a rotating element, vibrating element, or the like may be used as a movement sensor for detecting for a movement of the controller 7. Exemplary MEMS gyro-sensors that may be used in this exemplary embodiment are available from Analog Devices, Inc. Unlike the acceleration sensor 701, a gyro-sensor is capable of directly detecting rotation (or angular rate) around at least one axis defined by the gyroscopic element therein. Thus, due to the fundamental differences between a gyro-sensor and an acceleration sensor, corresponding changes need to be made to the processing operations that are performed on the output signals from these devices depending on which device is selected for a particular application.

More specifically, when the tilt or attitude is calculated using a gyro-sensor instead of the acceleration sensor, significant changes are necessary. Specifically, when using a gyro-sensor, the value of the tilt is initialized at the start of the detection. Then, data on the angular rate which is output from the gyro-sensor is integrated. Next, a change amount in tilt from the value of the tilt initialized is calculated. In this case, the calculated tilt corresponds to an angle. In contrast, when the acceleration sensor calculates the tilt, the tilt is calculated by comparing the value of the gravitational acceleration of each axial component with a predetermined reference. Therefore, the calculated tilt can be represented as a vector. Thus, without initialization, an absolute direction can be determined with acceleration detection means. The type of the value calculated as the tilt is also very different between a gyro sensor and an acceleration sensor; i.e., the value is an angle when a gyro sensor is used and is a vector when an acceleration sensor is used. Therefore, when a gyro sensor is used instead of an acceleration sensor or vice versa, data on tilt also needs to be processed through a predetermined conversion taking into account the fundamental differences between these two devices. Due to the fact that the nature of a gyro sensor is known to one skilled in the art, as well as the fundamental differences between the acceleration detection means and the gyro sensor, further details are not provided herein. While a gyro-sensor is advantageous in that a rotation can be directly detected, an acceleration sensor is generally more cost effective when used in connection with the controller described herein.

The communication section 75 includes the microcomputer 751, a memory 752, the wireless module 753 and the antenna 754. The microcomputer 751 controls the wireless module 753 for wirelessly transmitting the transmission data while using the memory 752 as a storage area during the processing. The microcomputer 751 controls operations of the sound IC 707 and the vibrator 704 based on the data received from the game apparatus body 3 by the wireless module 753 via the antenna 754. The sound IC 707 processes the sound data and the like transmitted from the game apparatus body 3 via the communication section 75. Further, the microcomputer 751 actuates the vibrator 704 based on, for example, the vibration data (for example, a signal for powering the vibrator 704 ON or OFF) transmitted by the game apparatus body 3 via the communication section 75.

Data from the controller 7 including an operation signal (key data) from the operation section 72, acceleration signals (x, y, and z-axial direction acceleration data, and hereinafter, simply referred to as acceleration data) from the acceleration sensor 701, and the process result data from the imaging information calculation section 74 are outputted to the microcomputer 751. The microcomputer 751 temporarily stores the respective input data (the key data, the acceleration data, and process result data) in the memory 752 as the transmission data which is to be transmitted to the wireless controller module 19. The wireless transmission from the communication section 75 to the wireless controller module 19 is performed periodically at predetermined time intervals. Since game processing is generally performed at a cycle of 1/60 sec., data needs to be transmitted at a cycle of a time period shorter than the cycle of the game processing. Specifically, the game process unit is 16.7 ms (1/60 sec.), and the transmission interval of the communication section 75 structured using the Bluetooth (registered trademark) technology is, for example, 5 ms. At a time at which the transmission to the wireless controller module 19 is to be performed, the microcomputer 751 outputs the transmission data stored in the memory 752 as a series of operation information to the wireless module 753. The wireless module 753 uses, for example, the Bluetooth (registered trademark) technology to transmit, from the antenna 754, operation information as a radio wave signal by using a carrier wave of a predetermined frequency. Thus, data from the controller 7 including the key data from the operation section 72, the acceleration data from the acceleration sensor 701, and the process result data from the imaging information calculation section 74 are modulated to a radio wave signal by the wireless module 753, and the radio wave signal is transmitted from the controller 7. The wireless controller module 19 of the game apparatus body 3 receives the radio wave signal, and the game apparatus body 3 demodulates or decodes the radio wave signal to obtain the series of operation information (the key data, the acceleration data, and the process result data). Based on the obtained operation information and the game program, the CPU 10 of the game apparatus body 3 performs the game processing. When the communication section 75 is structured by using the Bluetooth (registered trademark) technology, the communication section 75 can function so as to receive transmission data which is wirelessly transmitted from another device.

Figure 8:
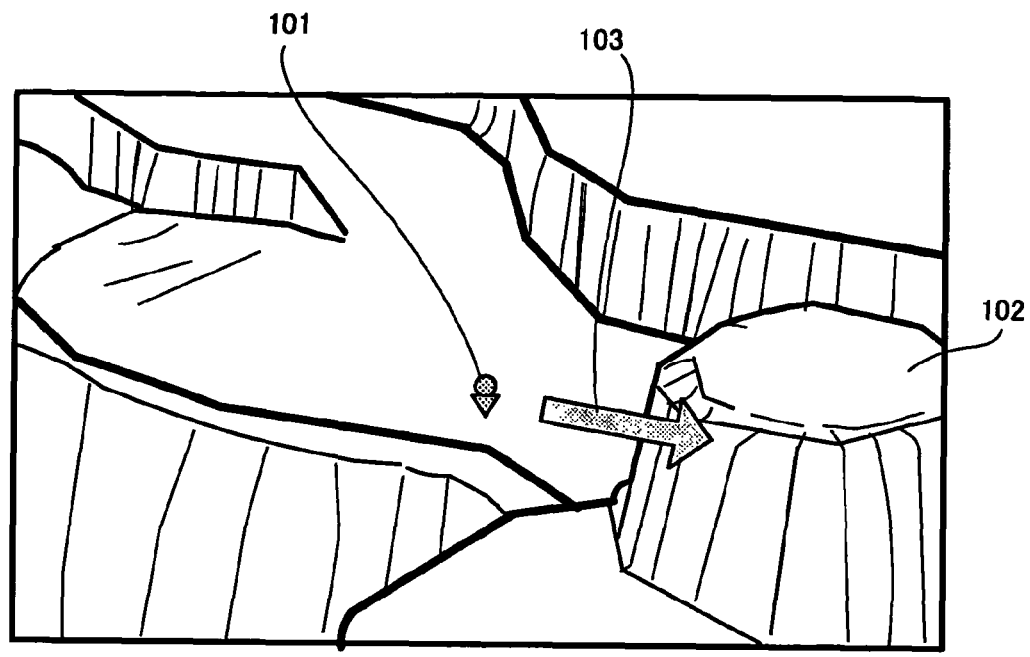
FIG. 8 is an exemplary game screen used for the exemplary embodiment.

Next, an operation performed by the game apparatus body 3 having the configuration described above will be described. FIG. 8 shows an exemplary game screen used for this exemplary embodiment. On the game screen shown in FIG. 8, a three-dimensional virtual game space (hereinafter, simply referred to as a virtual space) is displayed as viewed from diagonally above. A player object 101 is displayed at almost the center of the game screen. Further, a topography object 102 (which is handled as a rocky mountain in the virtual space, and is hereinafter simply referred to as a rocky mountain) is also displayed to the right of the player object 101.

In a technique of rendering a game screen according to this exemplary embodiment, a so-called Z buffer algorithm is used. Specifically, a pixel forming a screen has information (Z value) relating to the depth as well as color information (RGB value). When the rendering on the screen is performed, objects to be rendered in a pixel corresponding to a certain one coordinate point are compared with each other in the depth information, so as to display, on the screen, only an object which is most anterior among the objects. More specifically, when an object is rendered in a predetermined pixel on the screen, the Z value of the surface of the object is stored in the Z buffer 11g. When another object is to be thereafter rendered in the same predetermined pixel, the Z value stored in the Z buffer is compared with the Z value of the another object to be rendered. When the Z value of the another object to be rendered is larger than the Z value stored in the Z buffer, that is, when the another object to be rendered is positioned on the farther side of the virtual space than the object of which the Z value is stored in the Z buffer, the another object to be rendered is hidden behind the most anterior object which has its Z value stored in the Z buffer and is currently displayed. That is, the another object to be rendered is not viewed, so that the process of rendering in the pixel is eliminated.

In a game of this exemplary embodiment, the player object 101 is moved in accordance with an operation performed by a player. A virtual camera used for the game of this exemplary embodiment moves so as to follow a movement of the player object 101 such that the player object 101 is fundamentally displayed at almost the center of the screen. More specifically, in the game of this exemplary embodiment, the center point of the player object 101 is set as the sight point of the virtual camera. The sight point of the virtual camera may be any predetermined point of the player object 101.

Figure 9:
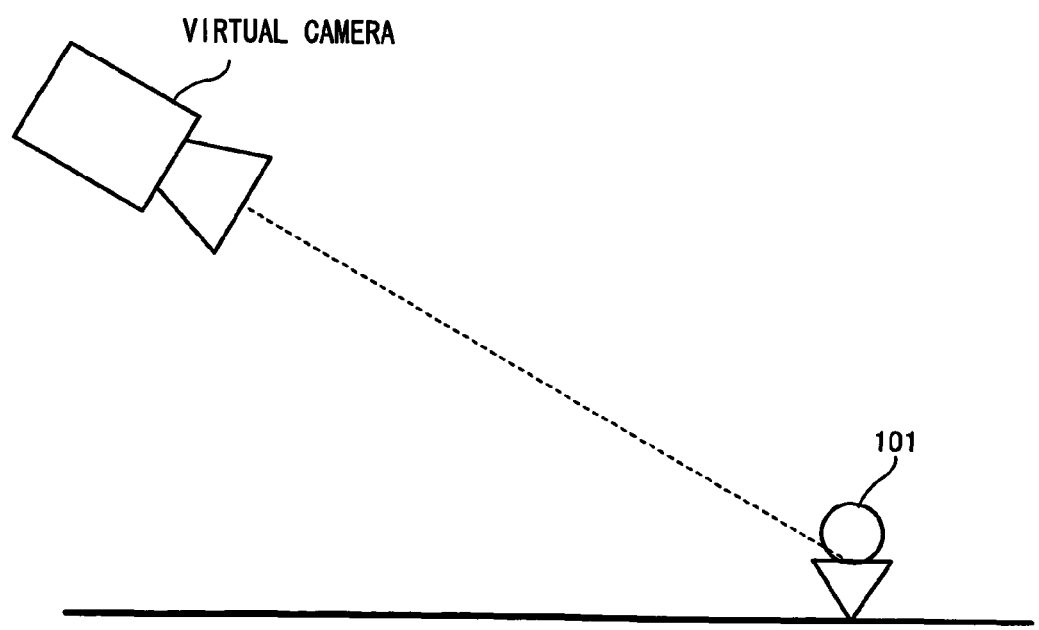
FIG. 9 is a diagram schematically illustrating a positional relationship between a virtual camera and a player object 101 in a game screen as shown in FIG. 8.

FIG. 9 is a diagram schematically illustrating a positional relationship between the virtual camera and the player object 101 for the game screen as shown in FIG. 8. In this state, no obstacle is positioned between the virtual camera (the point of view) and the player object 101 (the sight point), and a figure of the player object 101 can be acquired by the virtual camera.

Figure 10:
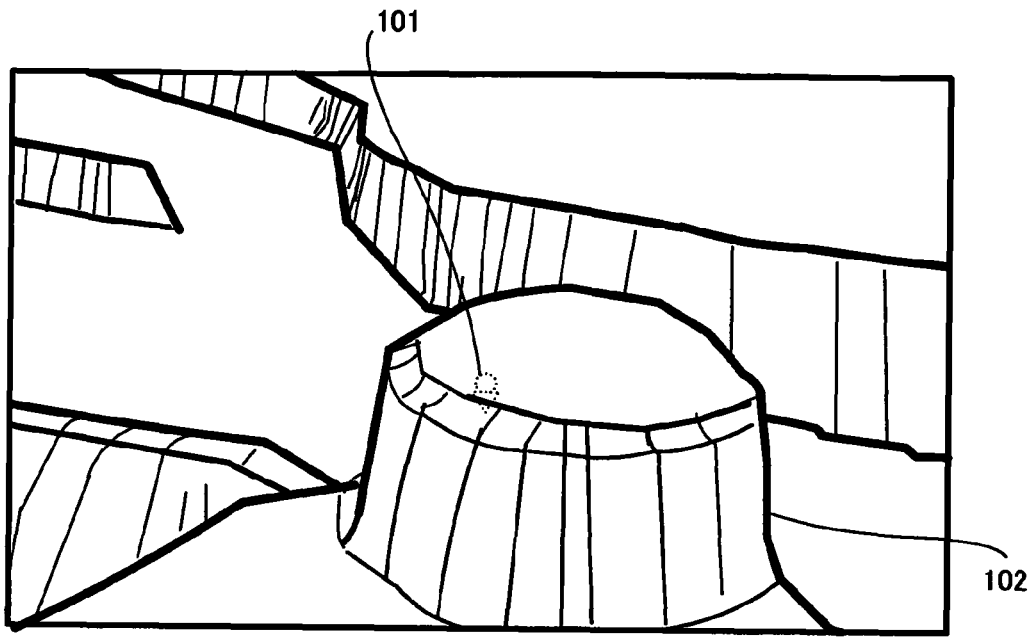
FIG. 10 shows an exemplary game screen used for the exemplary embodiment.
Figure 11:
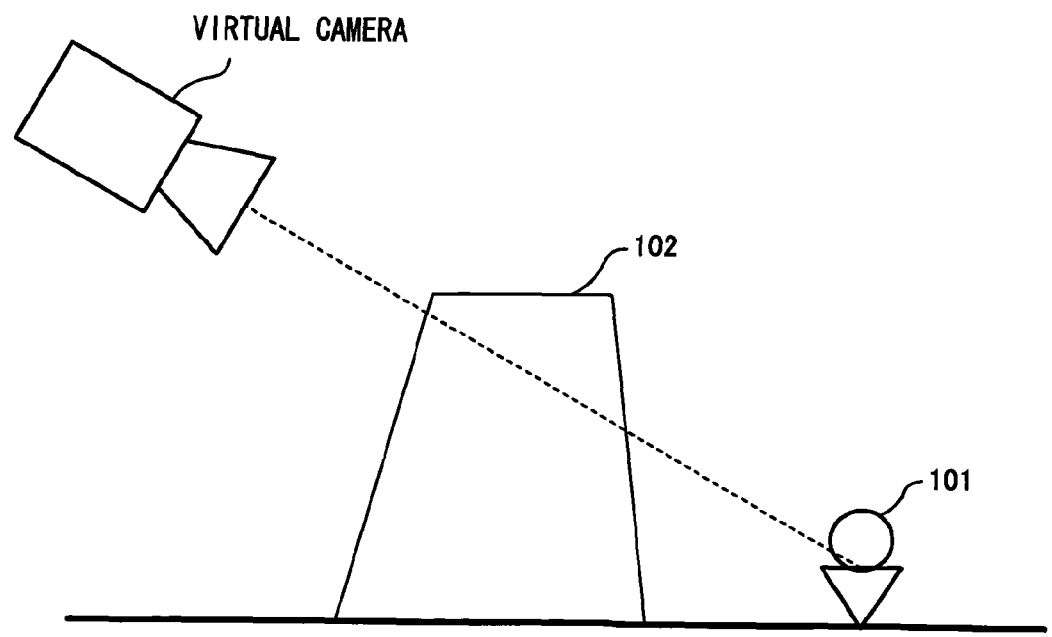
FIG. 11 is a diagram schematically illustrating a positional relationship between the virtual camera and the player object 101 in a game screen as shown in FIG. 10.
Figure 12:
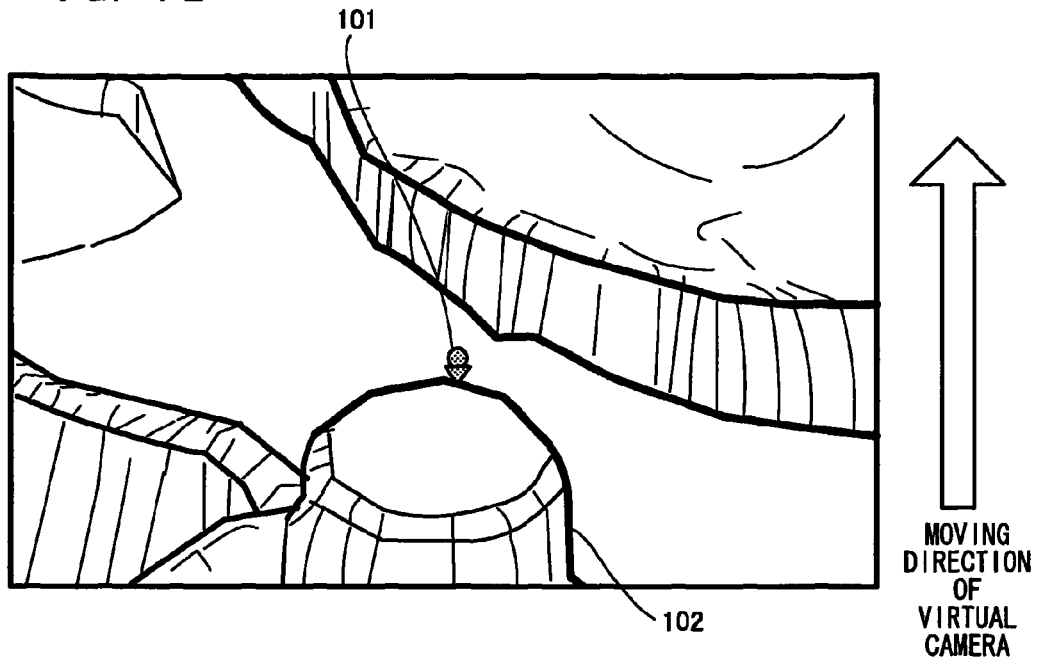
FIG. 12 shows an exemplary game screen used for the exemplary embodiment.
Figure 13:
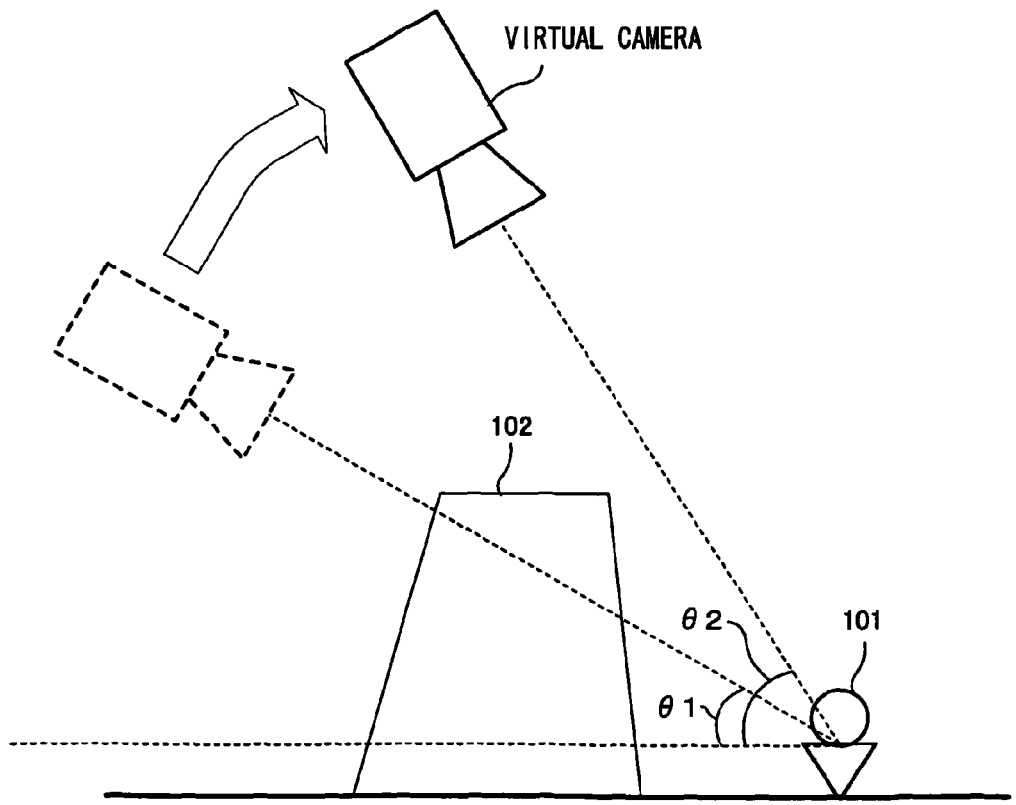
FIG. 13 is a diagram schematically illustrating a positional relationship between the virtual camera and the player object 101 in a game screen as shown in FIG. 12.

In the state shown in FIG. 8, when the player object 101 is moved rightward as indicated by an arrow 103, the player object 101 is hidden behind the rocky mountain 102 as shown in FIG. 10 (in FIG. 10, the rocky mountain 102 is transparent for displaying the player object 101 so as to make the description easily understandable). FIG. 11 is a diagram schematically illustrating a positional relationship between the virtual camera and the player object 101 for the game screen as shown in FIG. 10. In a state as shown in FIG. 11, the rocky mountain 102 is positioned on a straight line connecting between the virtual camera and the player object 101. Therefore, the player object 101 is invisible (that is, the player object 101 is not rendered on the game screen) to a player on the game screen in the state as shown in FIG. 10. Therefore, in the game of this exemplary embodiment, when the player object 101 is not viewed from the virtual camera due to an obstacle (the rocky mountain 102 in FIG. 10) hiding the player object 101, the virtual camera is moved upward. As a result, as shown in FIG. 12, the virtual camera is moved upward over the rocky mountain 102 so as to follow the player object 101, thereby rendering the player object 101 on the game screen. FIG. 13 is a diagram schematically illustrating a positional relationship between the virtual camera and the player object 101 for the game screen as shown in FIG. 12. As shown in FIG. 13, the virtual camera is moved and positioned at such an angle (an elevation angle) as to prevent the player object 101 from being hidden behind the rocky mountain 102. Specifically, in FIG. 13, the virtual camera is moved upward such that the elevation angle of the virtual camera is changed from θ1 to θ2 (θ1 represents an elevation angle of the virtual camera in the state as shown in FIG. 8 or FIG. 10).

As described above, in the game of this exemplary embodiment, when the player object 101 is invisible by being hidden behind an obstacle such as a topography object, the virtual camera is moved such that the player object 101 is visible. A movement rate of the virtual camera for this case is obtained through the following process in this exemplary embodiment.

Figure 14:
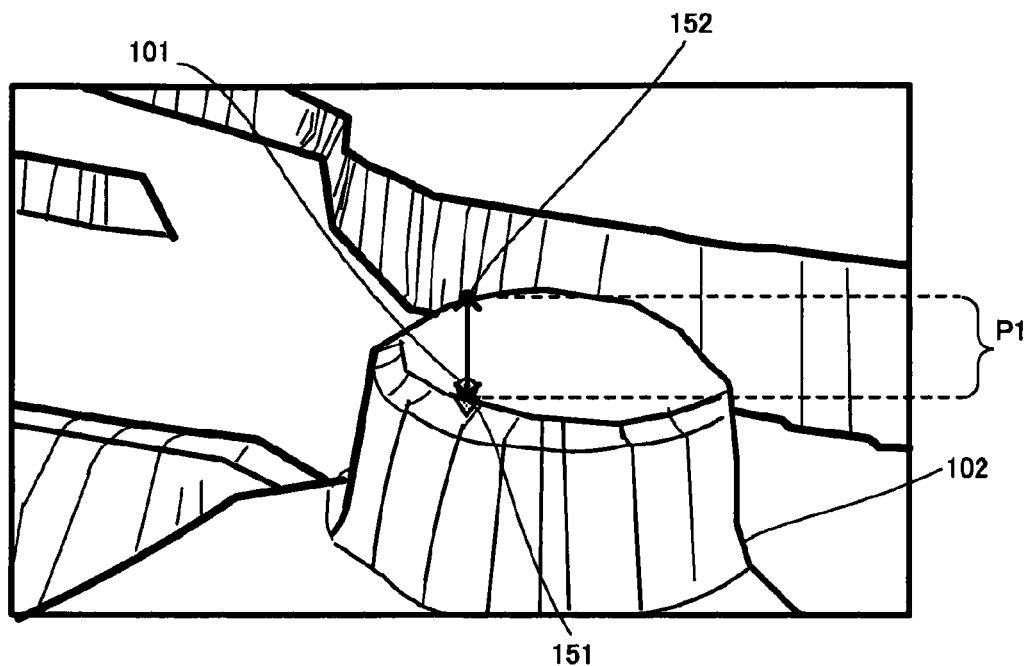
FIG. 14 is a diagram illustrating a principle for determining a movement rate of the virtual camera according to the exemplary embodiment.

FIG. 14 is a diagram illustrating a principle for determining a movement rate of the virtual camera according to this exemplary embodiment. When the player object 101 is hidden behind the rocky mountain 102 as viewed from the virtual camera, a coordinate point (hereinafter, referred to as a player 2D coordinate point) of a pixel 151 (in which the center point of the player object 101 is rendered if no obstacle is positioned) corresponding to the center point of the player object 101 is detected in the screen coordinate system. In the screen coordinate system of this exemplary embodiment, the coordinates of the top left corner of the screen are represented as (1, 1), and the coordinates of the bottom right corner of the screen are represented as (640, 480). In other words, the direction toward the right of the screen is the X-axis positive direction, and the direction toward the bottom of the screen is the Y-axis positive direction.

Figure 15:
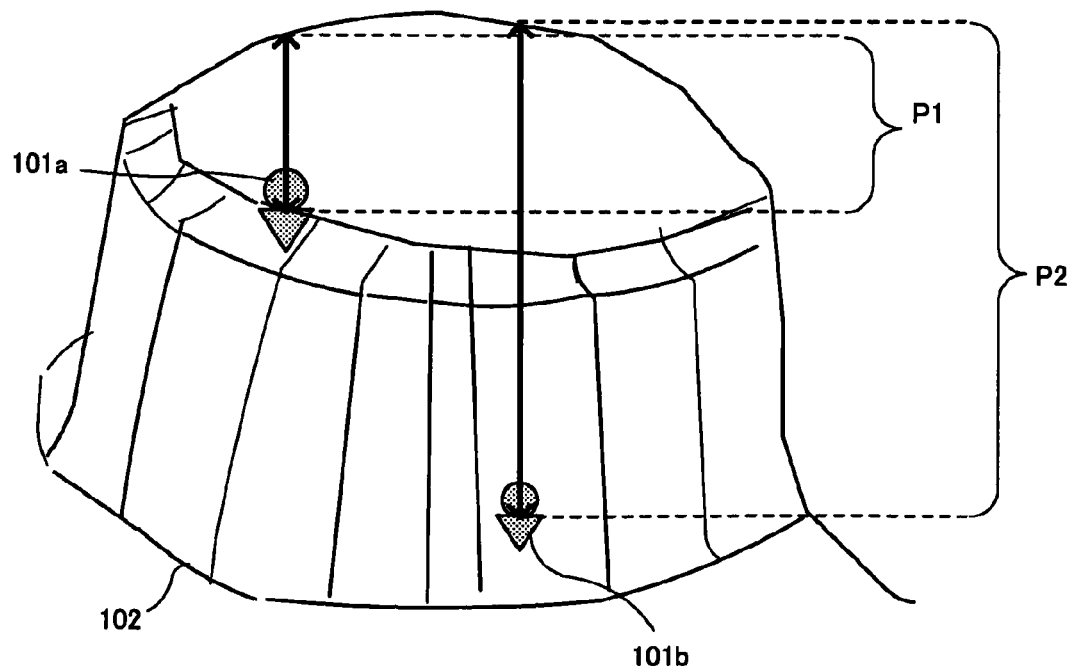
FIG. 15 is a diagram illustrating a principle for determining a movement rate of the virtual camera according to the exemplary embodiment.

Whether or not the rocky mountain 102 is rendered is checked for each pixel starting from the player 2D coordinate point toward the upward direction (Y-axis negative direction) until a pixel 152 immediately above, in the Y-axis negative direction, a pixel corresponding to the edge of the rocky mountain 102 is located. That is, the rocky mountain 102 is not rendered in the pixel 152. At this time, the number P1 of pixels is counted starting from a pixel corresponding to the player 2D coordinate point and ending at the pixel 152. The pixel 152 is a pixel immediately above, in the Y-axis negative direction, one of pixels representing the edge of the rocky mountain 102. Therefore, the number P1 of pixels is counted vertically upward from the pixel corresponding to the player 2D coordinate point to the pixel immediately above, in the Y-axis negative direction, the pixel corresponding to the edge of the rocky mountain 102. The movement rate (following rate) of the virtual camera is set based on the number P1 of pixels. Specifically, the movement rate of the virtual camera is set such that the greater the number of pixels is, the higher the movement rate of the virtual camera is. For example, in the screen coordinate system as shown in FIG. 15, a rate (the movement rate) at which the virtual camera moves upward is higher for the player object 101*b* positioned in the lower half of a region of the rocky mountain 102 than for the player object 101*a* positioned in the upper half of the region of the rocky mountain 102. That is, the number P2 of pixels counting from a pixel corresponding to the player object 101*b* is greater than the number P1 of pixels counting from a pixel corresponding to the player object 101*a*, whereby the movement rate of the virtual camera is higher for the player object 101*b* than for the player object 101*a*. In the processing described above, the virtual camera is allowed to be moved to a target point for a similar time period regardless of a moving distance.

Whether or not the rocky mountain 102 is rendered in each pixel is checked by comparing a Z value of a pixel corresponding to the player 2D coordinate point with a Z value, stored in the Z buffer 11*g*, of said each pixel to be checked. In this exemplary embodiment, the Z value ranges from 0.0 to 1.0, inclusive, and the closer the Z value is to 0.0, the more anterior side (that is, the side closer to the virtual camera) of the virtual space the Z value represents, and the closer the Z value is to 1.0, the farther side (depth) of the virtual space the Z value represents. Therefore, when the Z value stored in the Z buffer is smaller than the Z value of the player 2D coordinate point, it is determined that an obstacle (the rocky mountain 102 in an example shown in FIG. 14) is positioned between the virtual camera and the player object 101. When this determination is made, an obstacle (which is mainly a topography object) which hides the player object 101 has been already positioned in the virtual space, that is, the Z value of the obstacle such as the topography object has been already stored in the Z buffer 11*g*.

Specifically, in this exemplary embodiment, the Z value stored in the Z buffer is checked for each pixel starting from the pixel corresponding to the player 2D coordinate point in the upward direction, which is the Y-axis negative direction. The number of pixels is counted until the Z value stored in the Z buffer is larger than the Z value of the player 2D coordinate point (that is, until no obstacle hides the player object). The following rate at which the virtual camera moves so as to follow the player object is determined based on the counted number of pixels so as to move the virtual camera.

As described above, whether or not an obstacle is positioned between the virtual camera and the player object 101 is determined by the comparison between Z values, and the movement rate of the virtual camera is determined based on the counted number of pixels as described above. Therefore, the process of determining the movement rate of the virtual camera can be simplified as compared to a process of determining the movement rate of the virtual camera based on a distance, between the player object 101 and the rocky mountain 102 in the virtual space, calculated by using a three-dimensional calculation because, in this exemplary embodiment, process of determining the movement rate of the virtual camera can be realized by simply counting the number of pixels. Therefore, processing load of the CPU and the like can be reduced. Thus, even a game apparatus using the CPU and the like which operate at a slow processing speed can be used to provide a player with a three-dimensional game which is easily viewed and operated by the player.

Figure 16:
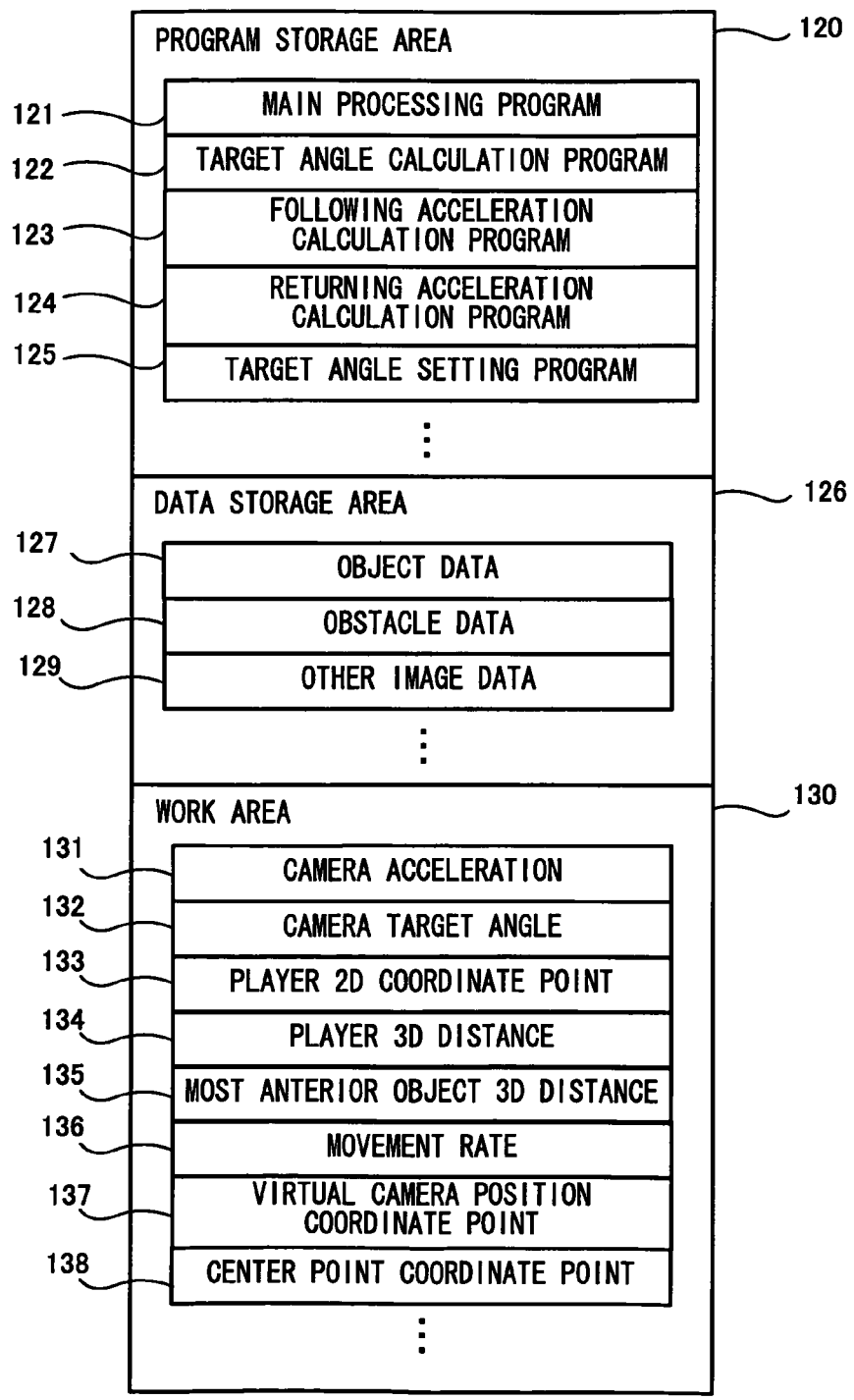
FIG. 16 is a diagram illustrating a memory map of an external main memory 12 shown in FIG. 2.

Next, game processing performed by the game apparatus body 3 will be described in detail. Firstly, data to be stored in the external main memory 12 when the game processing is performed will be described. FIG. 16 is a diagram illustrating a memory map of the external main memory 12 (the internal main memory 11e may be used instead of the external main memory 12, or both the external main memory 12 and the internal main memory 11e may be used) shown in FIG. 2. As shown in FIG. 16, the external main memory 12 includes a program storage area 120, a data storage area 126, and a work area 130. Data of the program storage area 120 and the data storage area 126 are previously stored in the disc 4, and loaded to the external main memory 12 for the game processing.

A game program to be executed by the CPU 10 is stored in the program storage area 120, and the game program includes a main processing program 121, a target angle calculation program 122, a following acceleration calculation program 123, a returning acceleration calculation program 124, a target angle setting program 125, and the like.

Figure 17:
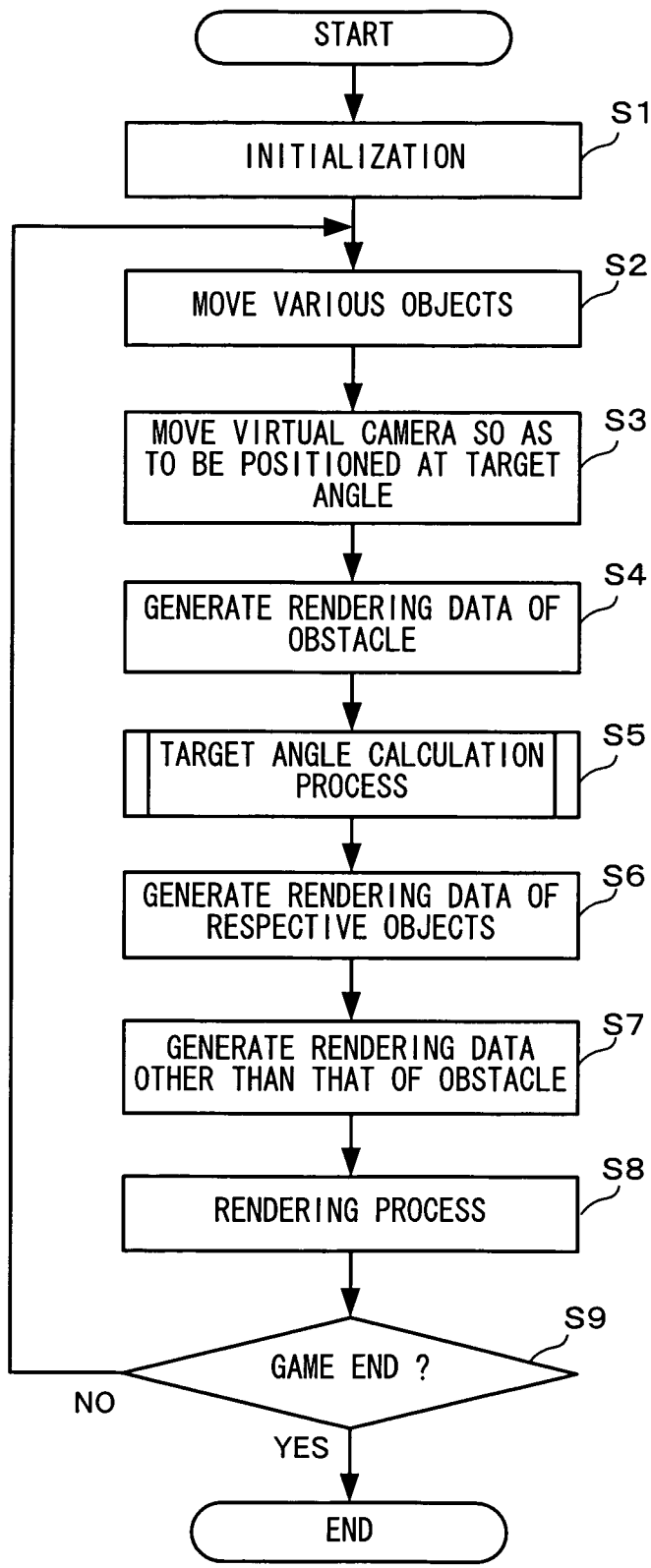
FIG. 17 is a flow chart showing a game process according to an exemplary embodiment.

The main processing program 121 is used for the processing shown in a flow chart of FIG. 17 described below. The target angle calculation program 122, the following acceleration calculation program 123, the returning acceleration calculation program 124, and the target angle setting program 125 are each a program for causing the CPU 10 to execute processing for controlling the virtual camera so as to follow the player object as described above.

In the data storage area 126, data such as object data 127, obstacle data 128, and other image data 129 are stored.

The object data 127 represents the player object 101 and a non-player object such as an opponent object. The object data 127 includes modeling data, texture data (RGB value), and the like of each object.

The obstacle data 128 represents a topography object such as the rocky mountain 102 described above. When such an object hides a figure of the player object 101 as viewed from the virtual camera, the virtual camera moves upward so as to follow the player object as described above.

The other image data 129 represents various effects (smoke, light, and the like) and a background image which are used in the game.

In the work area 130, data, such as variables and flags described below, which are used in the game process, are stored.

The camera acceleration 131 represents a parameter used for determining the movement rate of the virtual camera.

The camera target angle 132 represents an elevation angle of the virtual camera, and represents a destination to which the virtual camera is moved. That is, the virtual camera is moved so as to have the elevation angle represented by the camera target angle 132.

The player 2D coordinate point 133 represents a position at which the center point of the player object 101 is rendered in the screen coordinate system.

The player 3D distance 134 represents a distance in the depth direction between the virtual camera and the center point of the player object 101 in the virtual space.

The most anterior object 3D distance 135 is calculated based on the Z value stored in the Z buffer 11g. Specifically, the most anterior object 3D distance 135 is obtained by transforming the Z value of an object rendered in a predetermined pixel to a distance (Z coordinate point) in the depth direction of the virtual space. That is, the most anterior object 3D distance 135 represents a distance from the object rendered in the predetermined pixel to the virtual camera in the virtual space.

The movement rate 136 represents the movement rate at which the virtual camera moves upward so as to follow the player object, as described above.

The virtual camera position coordinate point 137 represents a position of the virtual camera in the three-dimensional game space.

The center point coordinate point 138 represents a position of the center point of the player object in the three-dimensional game space.

Next, game process to be executed in this exemplary embodiment will be described in detail with reference to FIGS. 17 to 23. When the game apparatus body 3 is powered on, the CPU 10 of the game apparatus body 3 executes a boot program stored in the ROM/RTC 13, so as to initialize the respective units such as the main memory 33. The game program stored in the optical disc 4 is loaded to the external main memory 12, and the CPU 10 starts to execute the game program. The flow chart shown in FIG. 17 is a flow chart illustrating game process performed after the process described above is completed.

Firstly, in step S1, data to be used in the following process is initialized. Specifically, data representing an initial position of the virtual camera, and initial positioning of various objects for the start of the game are stored in the external main memory 12. A predetermined initial angle is set as the camera target angle 132, and the camera target angle 132 is stored in the external main memory 12. Other than the data described above, variables and flags in the work area 130 used for the following process are initialized.

Next, a three-dimensional virtual game space is generated and displayed on the television set 2. Specifically, the CPU 10 generates a three-dimensional game space, and positions respective objects in accordance with the data representing the initial positioning of the respective objects. An image of the game space generated as described above is taken by the virtual camera so as to generate a game image, and the generated game image is displayed on the television set 2. Thereafter, a process loop of steps S2 to S9 is performed in each one frame (corresponding to 1/60 seconds in this exemplary embodiment), and the process loop is repeated every frame, thereby playing the game.

Next, in step S2, various objects are moved. Specifically, the CPU 10 moves objects (non-player objects such as an opponent object) other than the player object 101 in the virtual space as necessary. Subsequently, the operation data representing a content of an operation performed by a player is acquired from the controller 7. The CPU 10 moves the player object 101 in the virtual space in accordance with the operation data.

Next, in step S3, the CPU 10 moves the virtual camera to such a position that the elevation angle of the virtual camera is equal to an angle represented by the camera target angle 132. In an initial frame, the CPU 10 moves the virtual camera such that the elevation angle represents an initial angle set in the initialization. In the subsequent frames, the CPU 10 moves the virtual camera such that the elevation angle is equal to an angle represented by the camera target angle 132 calculated in the target angle calculation process described below.

Next, in step S4, rendering data of an object (an object over which the virtual camera moves so as to follow the player object 101 when the player object 101 is hidden as viewed from the virtual camera) representing an obstacle such as a topography object is generated. Specifically, the CPU 10 generates the rendering data of the topography object and the like as viewed from the virtual camera having been moved so as to be positioned at an angle represented by the camera target angle 132. More specifically, projective transformation and conversion to the screen coordinate system are performed for the topography object. Thus, a rendering position (pixel coordinate point) at which the topography object is to be rendered on the screen is determined, and the RGB value of the topography object is written, in the frame buffer 11*f*, at a memory address corresponding to the rendering position. At this time, the Z buffer 11*g* is updated based on the Z value (which has been obtained in the conversion described above) of the topography object. In this exemplary embodiment, the Z value of the rocky mountain 102 shown in FIG. 10 is, for example, "0.3".

Next, in step S5, a target angle is calculated. At this time, an obstacle positioned between the virtual camera and the player object 101 is determined and the camera target angle 132 is set. This process will be described below in detail.

Next, in step S6, rendering data of the respective objects are generated. Specifically, the CPU 10 generates the rendering data of the respective objects, and stores the rendering data in the frame buffer 11*f* (it should be understood that the player object 101 hidden behind an obstacle is not stored in the frame buffer).

Next, in step S7, rendering data of a non-obstacle, which represents a background image, an image effect, and the like, is generated. That is, the CPU 10 generates the rendering data of the non-obstacle as necessary, and stores the rendering data in the frame buffer 11*f*.

In step S8, the rendering on the television set 2 is performed. Specifically, data (that is, an image representing a virtual space acquired by the virtual camera) stored in the frame buffer 11*f* is read so as to be displayed as a game image on the television set 2. Following step S8, in step S9, whether or not the game is to be ended is determined. When the determination represents YES, the game process is ended. When the determination represents NO, the process is returned to step S2, and the game process as described above is repeated.

Figure 18:
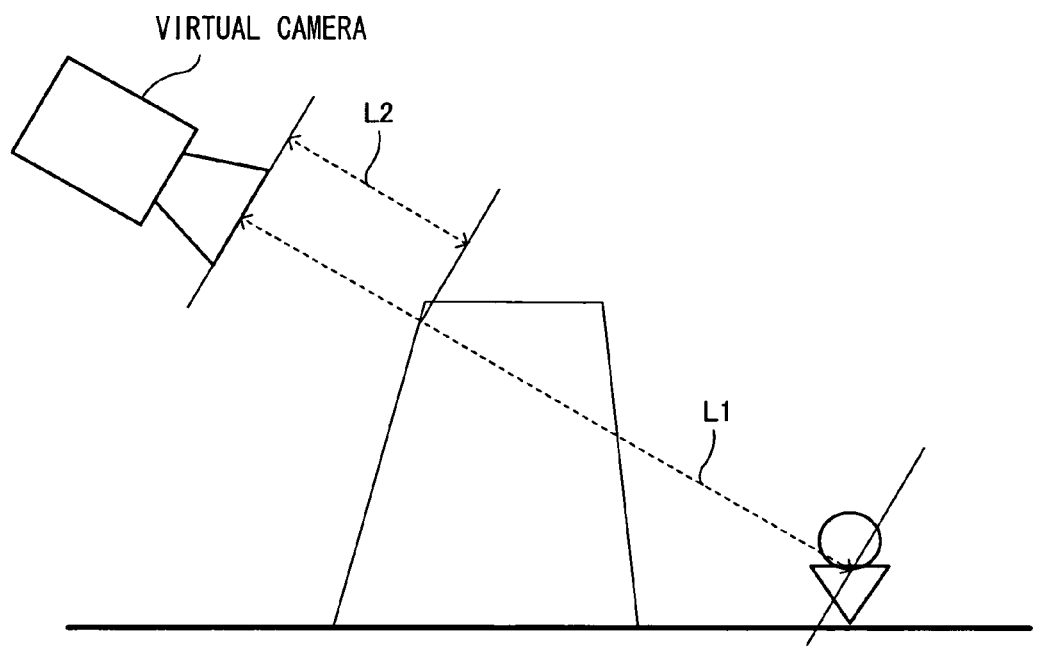
FIG. 18 is a diagram illustrating an outline of a target angle calculation process.

Next, the target angle calculation process of step S5 will be described. Firstly, an outline of the target angle calculation process will be described with reference to FIGS. 18 and 19. FIG. 18 is a diagram illustrating, as an example, a case where the rocky mountain 102 is positioned between the virtual camera and the player object 101. That is, an exemplary case where the player object 101 is invisible by being hidden behind the rocky mountain 102 as shown in FIG. 11, is shown.

Figure 19:
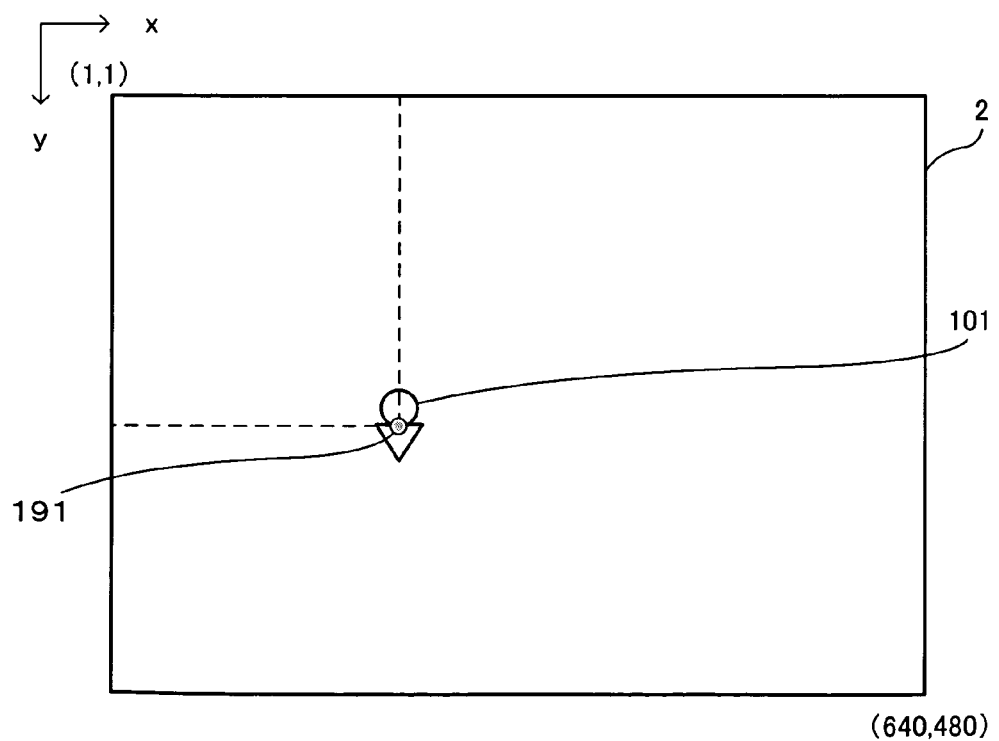
FIG. 19 is a diagram illustrating an outline of a target angle calculation process.

In FIG. 18, a distance L1 between the virtual camera and the center point of the player object 101 in the virtual space is calculated in this process. Next, the player 2D coordinate point 133, that is, a coordinate point of a pixel corresponding to a position of the center point of the player object 101 in the two-dimensional image (in the screen coordinate system), is calculated. That is, as shown in FIG. 19, a coordinate point 191 of the center point of the player object 101 which is to be rendered if no obstacle is positioned between the virtual camera and the player object 101 is calculated as the player 2D coordinate point 133. In FIG. 19, the coordinates of the top left corner of the screen are represented as (1, 1), and the coordinates of the bottom right corner of the screen are represented as (640, 480).

Next, the Z value of the player 2D coordinate point 133 is acquired from the Z buffer 11*g*. Before this process is performed, the generation of the rendering data of the topography object, storage of the rendering data of the topography object in the frame buffer, and update of the Z buffer as described above have been completed in step S4. Therefore, in this process, the Z value of an object which is most anterior in the coordinate system is acquired. In this exemplary embodiment, the Z value of the rocky mountain 102, "0.3", is acquired.

Next, calculated is a distance (a distance L2 in FIG. 18), represented by the Z value having been acquired, in the depth direction of the virtual space. The distance can be calculated, for example, by using projection matrix.

Next, a difference between the distance L1 and the distance L2 is calculated. When the difference represents a value lower than or equal to a predetermined value (that is, when the distance L1 is almost equal to the distance L2), no obstacle is determined as being positioned between the virtual camera and the player object 101. On the other hand, when the difference represents a value greater than the predetermined value, an obstacle is determined as being positioned therebetween (as shown in FIG. 18), and a following acceleration calculation process is performed as described below.

Figure 20:
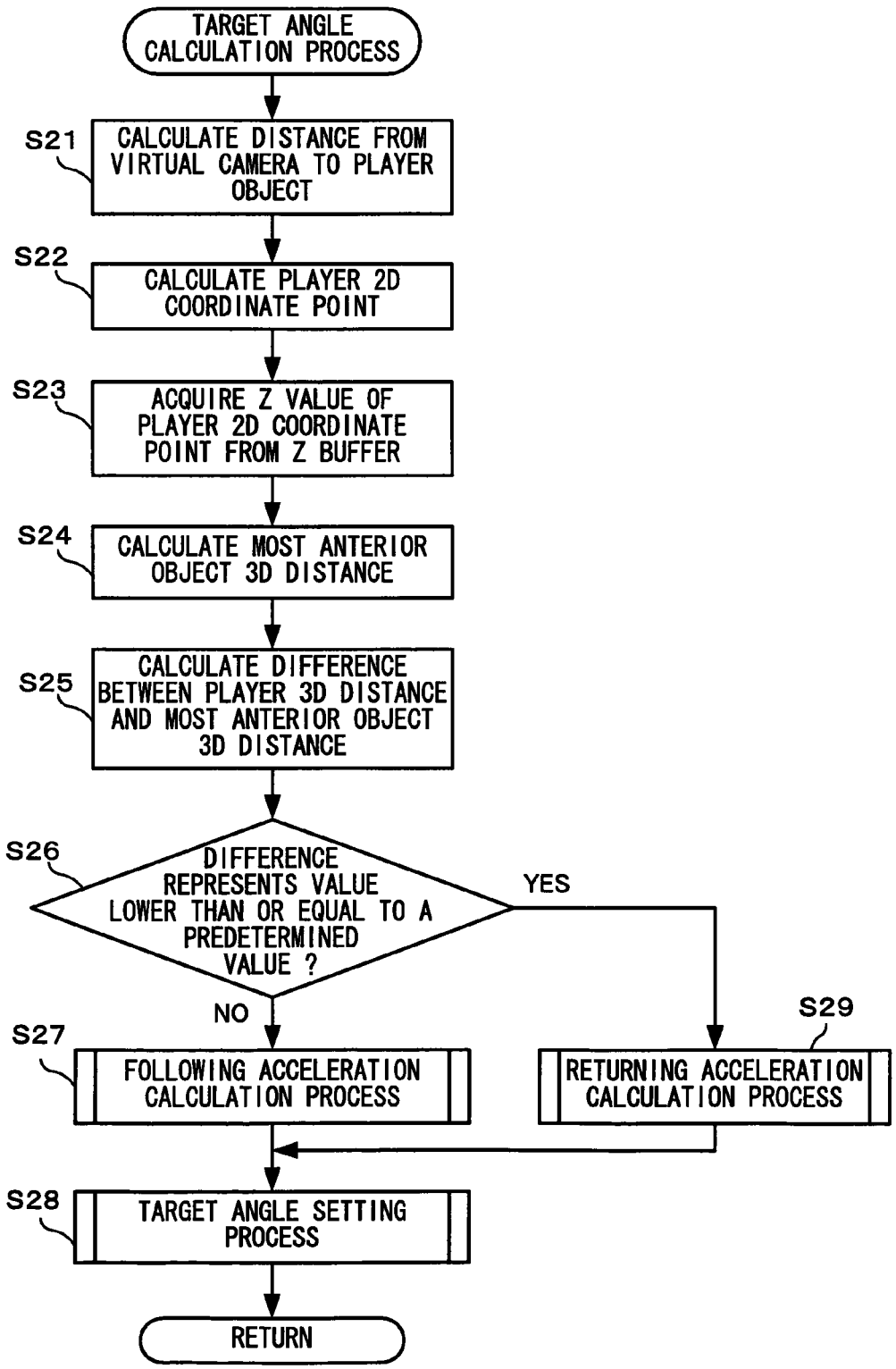
FIG. 20 is a flow chart showing in detail the target angle calculation process of step S5 shown in FIG. 17.

FIG. 20 is a flow chart showing in detail the target angle calculation process of step S5. In FIG. 20, firstly, in step S21, the CPU 10 calculates a distance (the distance L1 in FIG. 18) from the virtual camera position coordinate point 137 to the center point coordinate point 138 of the player object 101 in the game space. Hereinafter, the distance is referred to as the player 3D distance.

Next, in step S22, the CPU 10 converts the position coordinate point of the player object in the game space by using the projection matrix so as to obtain the player 2D coordinate point 133 (the coordinate point 191 in FIG. 19).

Next, in step S23, the CPU 10 acquires the Z value of the player 2D coordinate point 133 from the Z buffer 11*g*.

Next, in step S24, the CPU 10 calculates a distance (the distance L2 in FIG. 18) in the depth direction of the virtual space, based on the acquired Z value. That is, the CPU 10 converts, to a distance in the three-dimensional depth direction of the virtual space, the Z value which is stored in the Z buffer and ranges from 0.0 to 1.0. The conversion is performed, for example, by using the projection matrix. The calculated distance is stored as the most anterior object 3D distance 135 in the work area 130.

Next, in step S25, the CPU 10 calculates a difference between the player 3D distance 134 and the most anterior object 3D distance 135. In step S26, the CPU 10 determines whether or not the difference represents a value lower than or equal to a predetermined value. When the difference represents a value greater than the predetermined value (that is, when an obstacle is positioned), the following acceleration calculation process described below is performed in step S27. On the other hand, when the difference represents a value lower than or equal to the predetermined value (that is, no obstacle is positioned), the returning acceleration calculation process described below is performed in step S29.

In step S28, the target angle setting process described below is performed so as to calculate and set the camera target angle 132. This is the end of the target angle calculation process.

Next, the following acceleration calculation process of step S27 will be described. In this process, the number of pixels is counted as descried above. Based on the result of the counting, the camera acceleration 131 used for determining a movement rate at which the virtual camera is moved (upward) so as to follow the player object is calculated. In this exemplary embodiment, an acceleration is used to calculate a rate at which the virtual camera is moved so as to follow the player object because an acceleration needs to be used to perform other image processing such as screen effect processing for blurring the whole screen when the player object 101 is damaged. That is, an acceleration is used mainly for general purpose processing considering other image processing. Therefore, an acceleration is not necessarily used for calculating the movement rate of the virtual camera. The movement rate may be directly calculated as described below.

Figure 21:
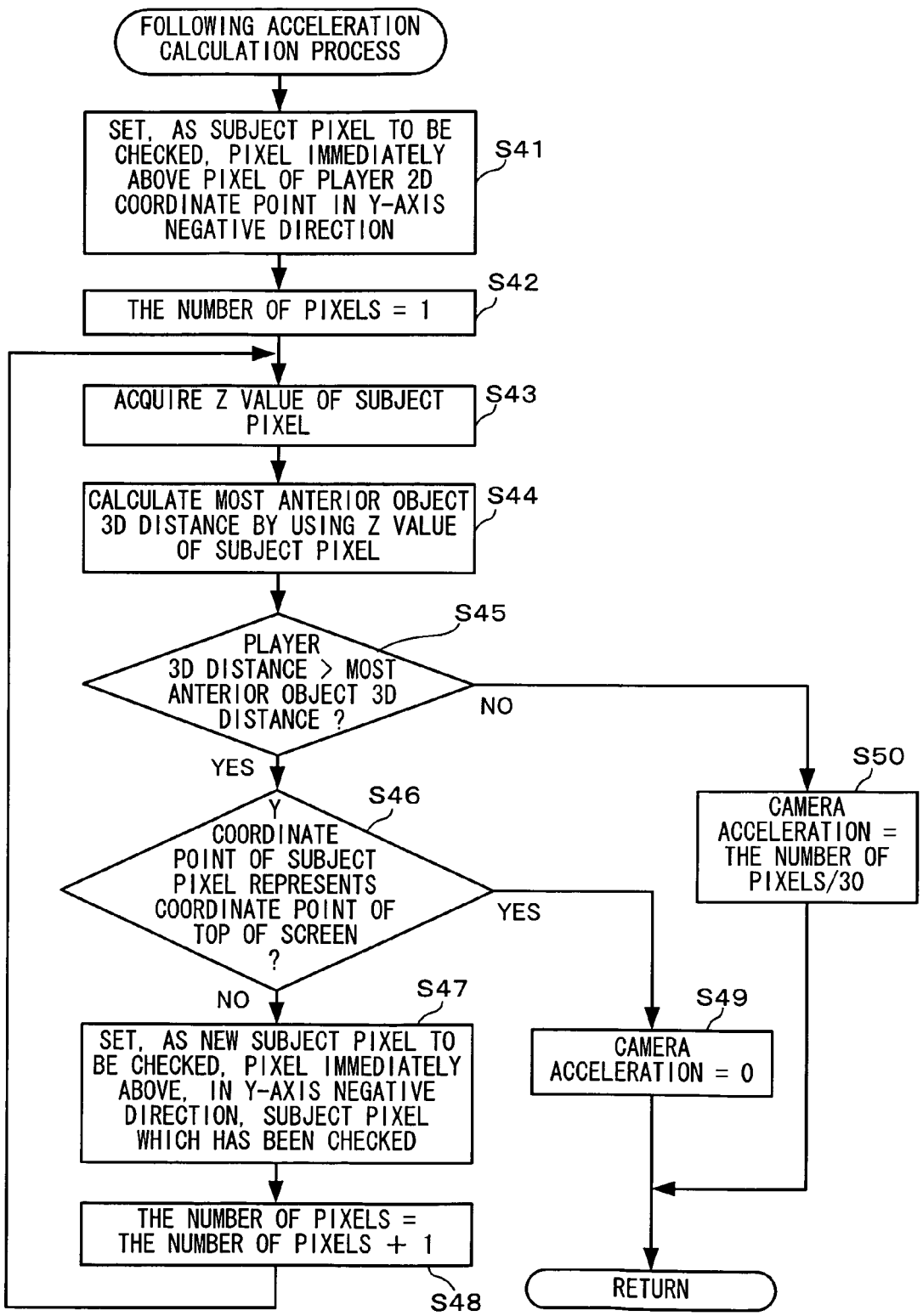
FIG. 21 is a flow chart showing in detail a following acceleration calculation process of step S27 shown in FIG. 20.

FIG. 21 is a flow chart showing in detail the following acceleration calculation process. In FIG. 21, firstly, in step S41, the CPU 10 sets, as a subject pixel to be checked, a pixel immediately above a pixel of the player 2D coordinate point in the Y-axis negative direction. In step S42, the CPU 10 counts the number of pixels as one.

Next, in step S43, the CPU 10 acquires, from the Z buffer 11g, the Z value of the subject pixel.

Next, in step S44, the CPU 10 calculates a distance, in the depth direction of the virtual space, represented by the Z value of the subject pixel which has been acquired in step S43. That is, the CPU 10 calculates the most anterior object 3D distance 135. This process is the same as the process step of step S24.

Next, in step S45, whether or not the player 3D distance 134 is greater than the most anterior object 3D distance 135 is determined. When in step S45 the player 3D distance 134 is determined as being smaller than or equal to the most anterior object 3D distance 135 (NO in step S45: in this case, a pixel immediately below the subject pixel in the Y-axis positive direction corresponds to a pixel representing the edge of the rocky mountain 102), the CPU 10 calculates, in step S50, the camera acceleration 131 using the following equation.

camera acceleration 131=the number of pixels/30

Thereafter, the CPU 10 ends the following acceleration calculation process.

On the other hand, when in step S45 the player 3D distance is determined as being greater than the most anterior object 3D distance (YES in step S45: that is, an obstacle is positioned between the virtual camera and the player object), the CPU 10 determines, in step S46, whether or not the Y coordinate point of the subject pixel represents the coordinate point of the top of the display area (screen). In other words, the CPU 10 determines whether or not all pixels to be checked, including the pixel of the top of the screen, have been checked. When the subject pixel is determined as representing the coordinate point of the top of the screen (YES in step S46: that is, all the pixels to be checked, including the pixel of the top of the screen, have been checked), the CPU 10 sets the camera acceleration 131 to "0", and ends the following acceleration calculation process.

On the other hand, it is determined in step S46 that the subject pixel does not represent the coordinate point of the top of the screen (NO in step S46, that is, all pixels to be checked have not been checked), the CPU 10 sets, as a new subject pixel to be checked, a pixel immediately above, in the Y-axis negative direction, the subject pixel which has been checked, in step S47. For example, when coordinates of the top left corner of the screen coordinate system are represented as (1, 1), and the coordinates of the bottom right corner of the screen coordinate system are represented as (640, 480) as described above, the CPU 10 subtracts one from the Y-coordinate value of the subject pixel.

Next, in step S48, the CPU 10 adds one to the number of pixels, and returns the process to step S43 so as to repeat the process steps described above. That is, the process steps described above are repeated until a pixel which is positioned immediately above, in the Y-axis negative direction, a pixel representing the edge of an obstacle and does not represent the obstacle, is located, or all pixels to be checked, including a pixel of the top of the screen, have been checked. This is the end of the following acceleration calculation process.

Figure 22:
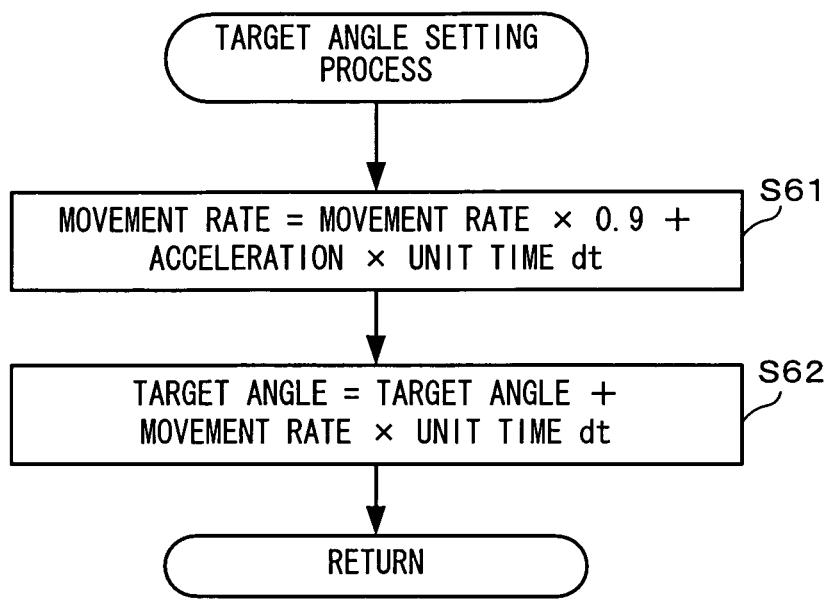
FIG. 22 is a flow chart showing in detail a target angle setting process of step S28 shown in FIG. 20.

Next, the target angle setting process will be described. In this process, the movement rate of the virtual camera based on the acceleration having been calculated as described above, and the camera target angle 132 are determined. FIG. 22 is a flow chart showing in detail the target angle setting process of step S28. Firstly, in step S61, the CPU 10 calculates, by using the following equation, the movement rate 136 of the virtual camera which moves so as to follow the player object.

movement rate 136=movement rate 136×0.9+camera acceleration 131×unit time dt

The unit time dt is a constant, and is set to "1/60" corresponding to a processing time of one frame in this exemplary embodiment. Further, "0.9" in the above equation is a coefficient for attenuating the movement rate so as to make the movement of the virtual camera natural (such that a player does not feel uncomfortable).

Next, in step S62, the CPU 10 calculates the camera target angle 132 by using the following equation.

camera target angle 132=camera target angle 132+ movement rate 136×unit time dt

Thus, the target angle (that is, a position to which the virtual camera is to move) of the virtual camera is determined for the process loop of the immediately following frame. This is the end of the target angle setting process.

Next, the returning acceleration calculation process of step S29 will be described. In this process, in a case where the position of the virtual camera is moved too high when the virtual camera follows the player object as described above, the position of the virtual camera is slightly lowered. In this exemplary embodiment, a rate at which the virtual camera is moved is based on the acceleration as described above, and therefore an inertial force is slightly generated in the movement of the virtual camera moving upward so as to follow the player object. As a result, when the virtual camera is moved upward and positioned at such an angle as to view the player object 101, the virtual camera does not stop suddenly and continues to move upward, so that the virtual camera stops at a position which is slightly too high. Therefore, it is necessary to perform process for returning the virtual camera from the position which is slightly too high. This is performed so as to provide a player with a screen which is viewed as easily as possible.

Figure 23:
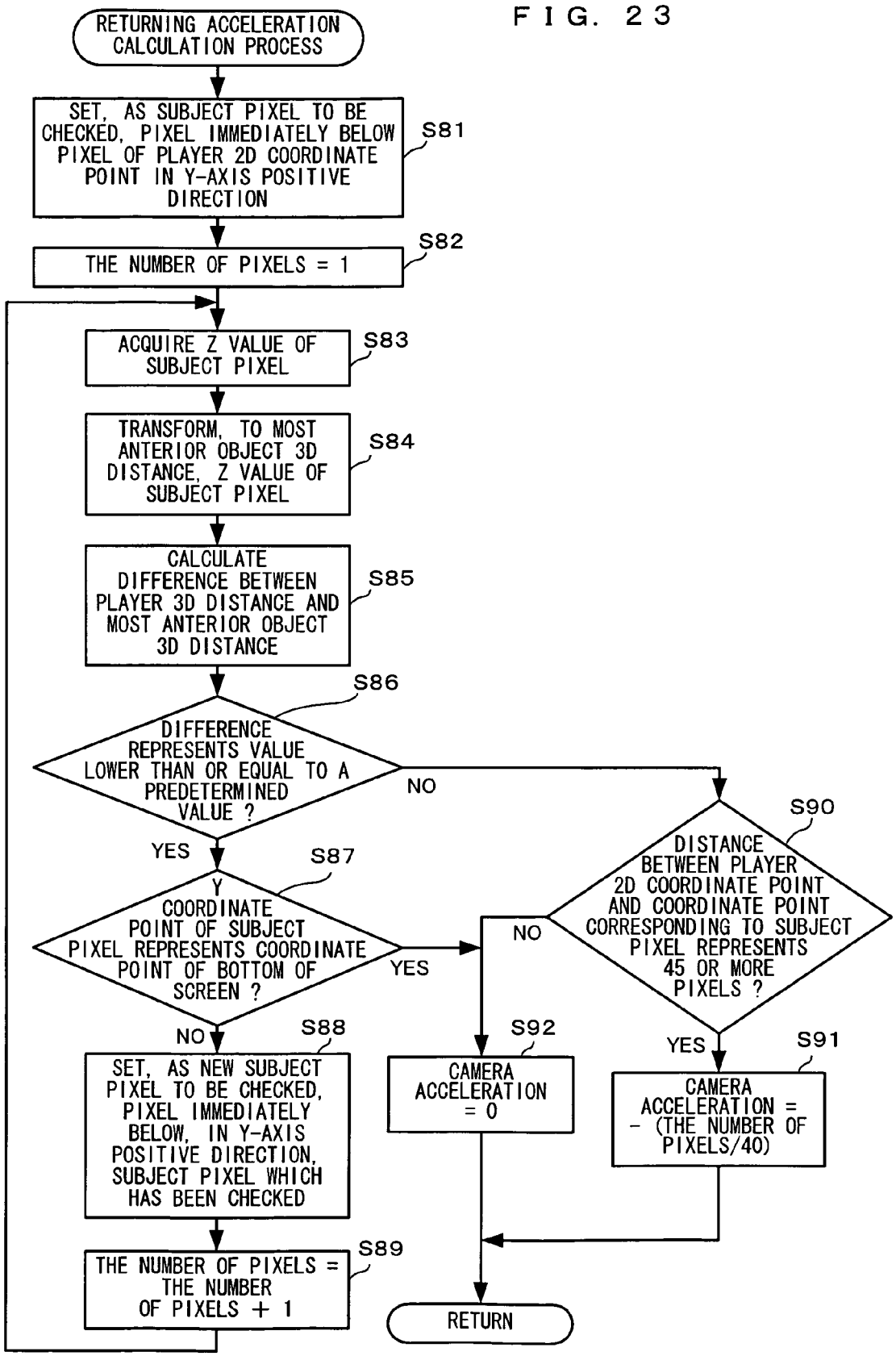
FIG. 23 is a flow chart showing in detail returning acceleration calculation process of step S29 shown in FIG. 20.

FIG. 23 is a flow chart showing in detail the returning acceleration calculation process of step S29. In FIG. 23, firstly, in step S81, the CPU 10 sets, as a subject pixel to be checked, a pixel immediately below a pixel of the player 2D coordinate point 133 in the Y-axis positive direction. In step S82, the CPU 10 counts the number of pixels as one.

Next, in step S83, the CPU 10 acquires, from the Z buffer 11g, the Z value of the subject pixel. In step S84, the CPU 10 calculates the most anterior object 3D distance 135 based on the Z value by using the projection matrix.

Next, in step S85, the CPU 10 calculates a difference between the player 3D distance 134 and the most anterior object 3D distance 135. In step S86, the CPU 10 determines whether or not the calculated difference represents a value lower than or equal to a predetermined value. When the difference is determined as representing a value greater than the predetermined value (NO in step S86), the CPU 10 determines, in step S90, whether or not a distance between the player 2D coordinate point and the subject pixel represents 45 or more pixels. When in step S90 the distance is determined as representing 45 or more pixels (YES in step S90), the CPU 10 calculates, in step S91, the camera acceleration 131 by using the following equation.

camera acceleration 131=−(the number of pixels/40)

On the other hand, when in step S90 the distance is determined as representing 44 or less pixels (NO in step S90), the CPU 10 sets the camera acceleration 131 to "0", and ends the returning acceleration calculation process.

On the other hand, when in step S86 the calculated difference is determined as representing a value lower than or equal to the predetermined value (YES in step S86), the CPU 10 determines, in step S87, whether or not the Y coordinate point of the subject pixel represents a coordinate point of the bottom of the display area (screen). That is, the CPU 10 determines, in step S87, whether or not all the pixels to be checked, including the pixel of the bottom of the screen, have been checked. When the Y coordinate point of the subject pixel is determined as representing the coordinate point of the bottom of the screen (YES in step S87, that is, when all the pixels to be checked, including the pixel of the bottom of the screen, have been checked), the CPU 10 sets the camera acceleration 131 to "0", and ends the returning acceleration calculation process.

On the other hand, when it is determined, in step S87, that the coordinate point of the subject pixel does not represent the coordinate point of the bottom of the screen (NO in step S87), the CPU 10 sets, as a new subject pixel to be checked, a pixel immediately below, in the Y-axis positive direction, the subject pixel which has been checked, in step S88. For example, when the coordinates of the top left corner of the screen coordinate system are represented as (1, 1), and the coordinates of the bottom right corner of the screen coordinate system are represented as (640, 480), the CPU 10 adds one to the Y coordinate value of the subject pixel.

Next, in step S89, the CPU 10 adds one to the number of pixels, and returns the process to step S83 so as to repeat the process steps described above. This is the end of the returning acceleration calculation process.

As described above, in this exemplary embodiment, the number of pixels included in a linear distance from a position of a pixel of the player object 101 to be rendered in the case of no obstacle being positioned, to a position of a pixel immediately above, in the Y-axis negative direction, a pixel corresponding to the edge of an obstacle hiding the player object 101, is counted in the screen coordinate system. The following rate at which the virtual camera is moved so as to follow the player object is set based on the counted number of pixels. Specifically, a two-dimensional image processing is performed so as to calculate the following rate of the virtual camera. Therefore, processing load can be reduced as compared to in a case where a complicated three-dimensional calculation is used to calculate the following rate of the virtual camera. Therefore, even a game apparatus including a processor, such as the CPU, having its processing capacity reduced, is allowed to provide a player with a three-dimensional game which is easily viewed and operated by the player.

In this exemplary embodiment described above, the camera acceleration 131 is determined based on the counted number of pixels as described above, and the movement rate 136 of the virtual camera is determined based on the camera acceleration 131. However, the exemplary embodiments are not limited thereto. The movement rate 136 of the virtual camera may be determined based on the number of pixels. In this case, instead of calculating the camera acceleration 131, the movement rate 136 may be calculated by using the following equation, in step S50 described with reference to FIG. 21.

movement rate 136=the number of pixels/30

Further, in step S49, the movement rate 136 may be set to "0", instead of setting the camera acceleration 131 to "0". Furthermore, step S61 in the target angle setting process, described with reference to FIG. 22, is unnecessary. When step S61 is unnecessary, an inertial force is not generated in the movement of the virtual camera. Therefore, the returning acceleration calculation process of step S29 in FIG. 20 is unnecessary.

(Exemplary Modification)

Further, in the exemplary embodiment described above, when whether or not an obstacle is positioned is determined (process steps of steps S21 to S26), the most anterior object 3D distance is calculated based on the Z value (step S24). However, the calculation of the most anterior object 3D distance may be eliminated. That is, the Z value of the player object 101 is compared with the value, stored in the Z buffer 11g, corresponding to the player 2D coordinate point, so as to determine whether or not an obstacle is positioned.

Figure 24:
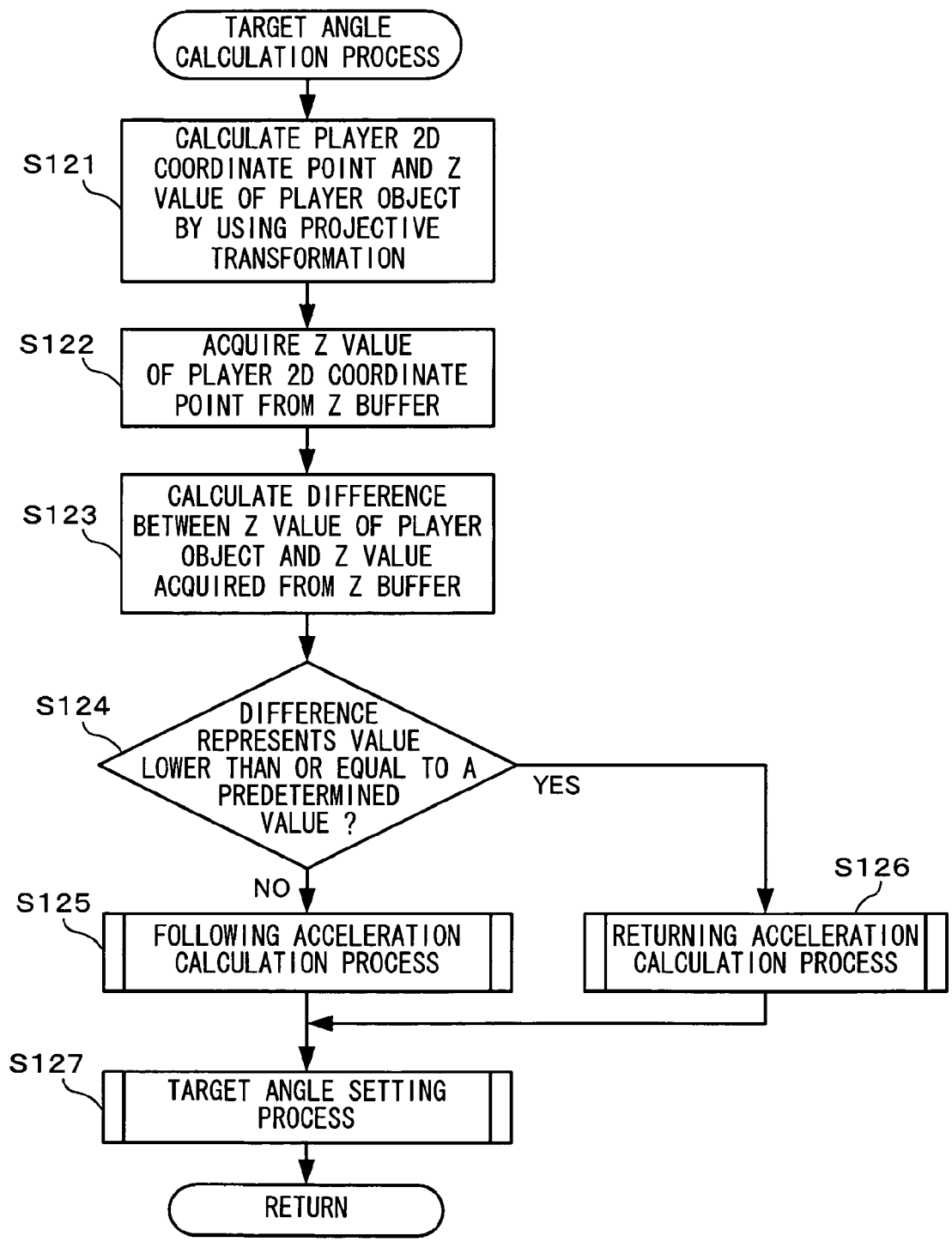
FIG. 24 is a flow chart showing target angle calculation process to be performed when whether or not an obstacle is positioned is determined based on comparison between Z values.

FIG. 24 is a flow chart showing target angle calculation process to be performed when whether or not an obstacle is positioned is determined based on the comparison between the Z values. In FIG. 24, firstly, in step S121, the CPU 10 performs projective transformation so as to calculate the player 2D coordinate point and a Z value of the player object 101.

Next, in step S122, the CPU 10 acquires, from the Z buffer 11g, a Z value of the player 2D coordinate point. In step S123, the CPU 10 calculates a difference between the Z value of the player object 101 calculated in step S121 and the Z value acquired from the Z buffer 11g in step S122. In step S124, the CPU 10 determines whether or not the difference represents a value lower than or equal to a predetermined value. When the difference is determined as representing a value greater than the predetermined value, the following acceleration calculation process is performed in step S125. When the difference is determined as representing a value lower than or equal to the predetermined value, the returning acceleration calculation process is performed in step S126.

Preferably, the predetermined value used in the determination of step S124 is changed, as necessary, depending on the Z value of the player object 101. In general, increase of the depth in the virtual space leads to reduction of the accuracy for obtaining the Z value through the projective transformation. For example, the Z value ranges from 0.0 to 1.0. When the coordinate value (Z coordinate value) in the depth direction of the virtual space ranges from 1500 to 2000, the Z value ranges from 0.0 to 0.5, for example. On the other hand, the Z coordinate value ranges from 2500 to 3000, the Z value ranges from 0.8 to 1.0. That is, the accuracy is reduced in the farther side of the virtual space as compared to in the anterior side of the virtual space. Therefore, in order to enhance the accuracy for determining whether or not an obstacle is positioned, it is preferable that process may be additionally performed such that the larger the Z value of the player object 101 is, the larger the predetermined value used in the determination is, for example.

Next, in step S127, the target angle setting process is performed. The target angle setting process is the same as the process step of step S28, and the description thereof is not given.

Figure 25:
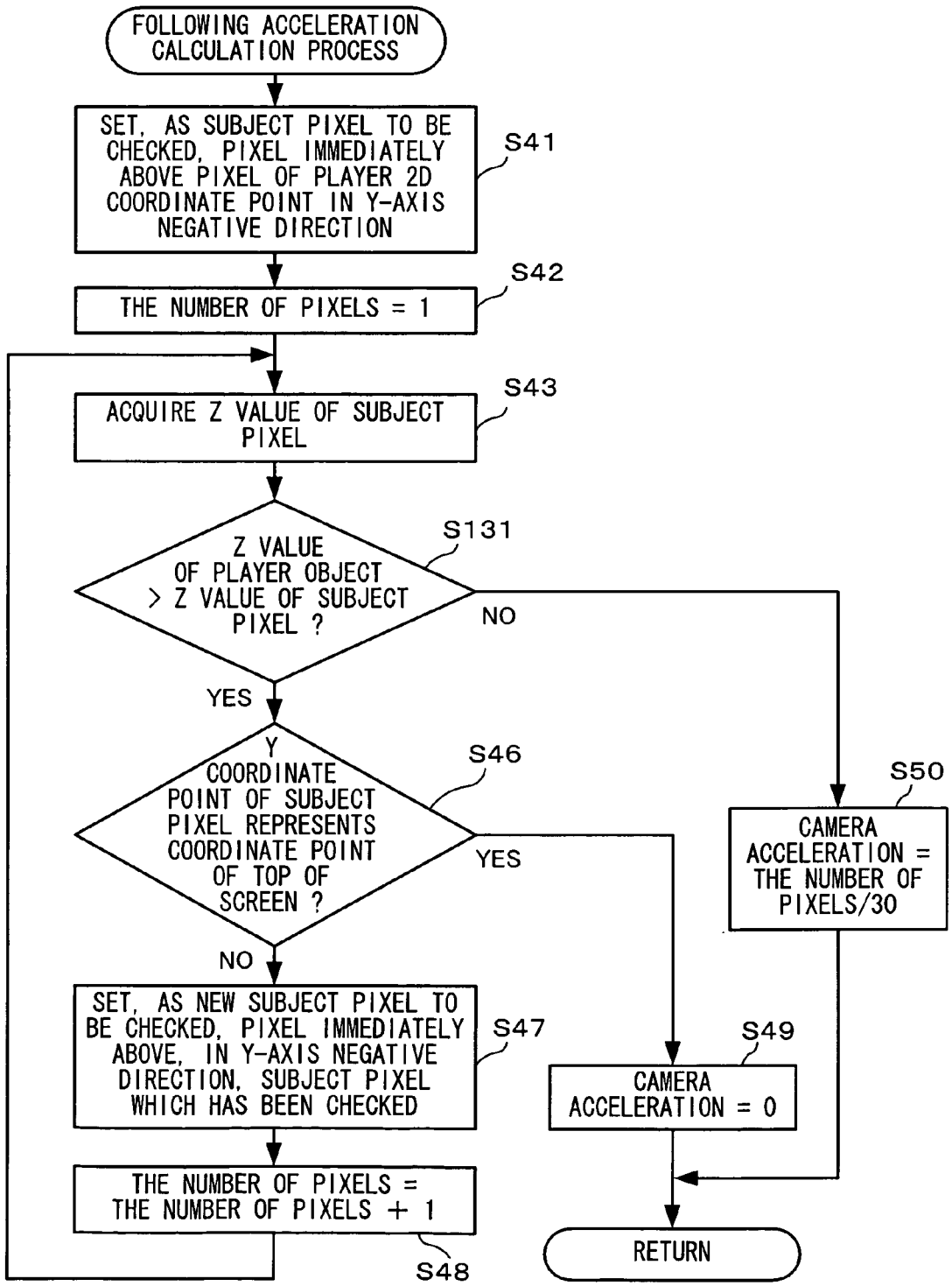
FIG. 25 is a flow chart showing in detail a following acceleration calculation process of step S125 shown in FIG. 24.

FIG. 25 is a flow chart showing in detail the following acceleration calculation process of step S125. Flow charts for steps S41 to S43, and steps S46 to S50 are the same as the flow chart shown in FIG. 21. In FIG. 25 and FIG. 21, the same steps are denoted by the same corresponding reference numerals. In the following description, process steps of step S43 and the following steps according to this exemplary embodiment will be mainly described.

In FIG. 25, when the Z value of the subject pixel to be checked is acquired from the Z buffer 11g in step S43, the CPU 10 determines, in step S131, whether or not the Z value of the player object 101 calculated in step S121 is greater than the Z value of the subject pixel. When the Z value of the player object 101 is determined as being greater than the Z value of the subject pixel (that is, when an obstacle is positioned in front of the player object 101, i.e., YES in step S131), the CPU 10 advances the process to step S46. On the other hand, when the Z value of the player object 101 is determined as being lower than or equal to the Z value of the subject pixel (that is, when no obstacle hides the player object 101, i.e., NO in step S131), the CPU 10 advances the process to step S50. The process steps of step S46 and the following steps are described above, and the repeated description thereof is unnecessary.

Figure 26:
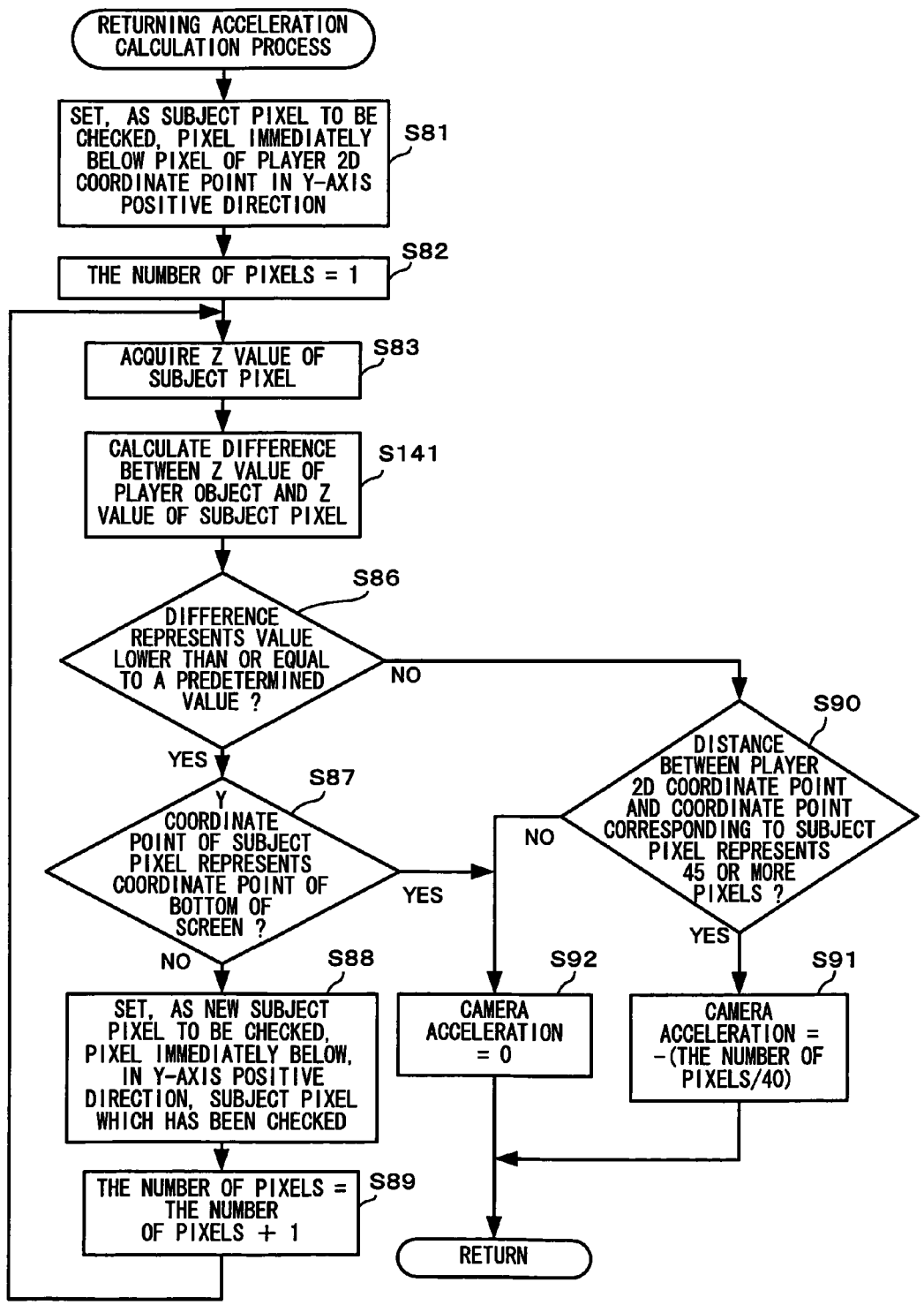
FIG. 26 is a flow chart showing in detail a returning acceleration calculation process of step S126 shown in FIG. 24.

FIG. 26 is a flow chart showing in detail the returning acceleration calculation process of step S126. Flow charts for steps S81 to S83, and steps S86 and the following steps are the same as the flow chart shown in FIG. 23. In FIG. 26 and FIG. 23, the same steps are denoted by the same corresponding reference numerals. In the following description, process steps of step S83 and the following steps according to this exemplary embodiment will be mainly described.

In FIG. 26, when the Z value of the subject pixel to be checked is acquired from the Z buffer 11g in step S83, the CPU 10 calculates, in step S141, a difference between the Z value of the player object 101 calculated in step S121 and the Z value of the subject pixel. In step S86, the CPU 10 determines whether or not the difference represents a value lower than or equal to a predetermined value. When the difference is determined as representing a value lower than or equal to the predetermined value (YES in step S86), the CPU 10 advances the process to step S87. On the other hand, when the difference is determined as representing a value greater than the predetermined value (NO in step S86), the CPU 10 advances the process to step S90. The process steps of step S87 and the following steps are the same as described above, and the repeated description thereof is unnecessary.

As described above, when the Z values are compared with each other so as to determine whether or not an obstacle is positioned, a three-dimensional calculation process (for example, steps S24 and S25 in FIG. 20) is unnecessary. Therefore, the certain exemplary embodiments are advantageous in that the processing load can be reduced. On the other hand, as described above, in general, increase of the depth in the virtual space leads to reduction of the accuracy for obtaining the Z value through the projective transformation. Therefore, the certain exemplary embodiments are advantageous in that when the process described with reference to FIG. 20 is performed, whether the player object 101 is in front of an obstacle or behind the obstacle can be determined with enhanced accuracy. That is, the certain exemplary embodiments are advantageous in that the determination is made based on the distance in the virtual space in combination with three-dimensional calculation, and therefore whether the player object 101 is in front of or behind an obstacle such as the rocky mountain 102 is determined with enhanced accuracy.

While certain exemplary embodiments have been described in detail, the foregoing description is in all aspects illustrative and not restrictive. It is understood that numerous other modifications and variations can be devised without departing from the scope thereof.

What is claimed is:

1. A non-transitory computer-readable storage medium having stored therein a game program executed by a computer of a game apparatus for generating a two-dimensional game image representing a state of a three-dimensional game space acquired by a virtual camera so as to display the two-dimensional game image by a display device, the game program causing the computer to function as:

a sight point pixel calculator for calculating a sight point pixel representing a pixel on the two-dimensional game image, the sight point pixel corresponding to a sight point of the virtual camera in the three-dimensional game space;

a camera movement controller for moving the virtual camera in the three-dimensional game space in accordance with a direction from the sight point pixel on the two-dimensional game image to a target pixel representing a predetermined pixel;

a number-of-pixels calculator for calculating a number of pixels included in a linear distance to the target pixel from the sight point pixel; and a movement rate setter for setting a movement rate of the virtual camera in accordance with the number of pixels calculated by the number-of-pixels calculator, wherein the camera movement controller moves the virtual camera in accordance with the movement rate having been set by the movement rate setter.

2. The computer-readable storage medium having stored therein the game program according to claim 1, wherein the game program causes the computer to further function as obstacle determination programmed logic circuitry for determining whether or not an obstacle is positioned, in the three-dimensional game space, on a straight line connecting between a point of view of the virtual camera and the sight point of the virtual camera, and wherein the-number-of-pixels calculator calculates the number of pixels included in the linear distance from the sight point pixel to the target pixel when the obstacle determination programmed logic circuitry determines that the obstacle is positioned.

3. The computer-readable storage medium having stored therein the game program according to claim 2, wherein the camera movement controller moves the virtual camera, in the three-dimensional game space, to a position, on the straight line connecting between the point of view of the virtual camera and the sight point thereof, at which no obstacle is positioned.

4. The computer-readable storage medium having stored therein the game program according to claim 3,
  wherein the-number-of-pixels calculator calculates the number of pixels included in a straight line extending vertically upward from the sight point pixel to the target pixel in the two-dimensional game image, and
  wherein the camera movement controller moves the virtual camera upward to a position, on the straight line connecting between the point of view of the virtual camera and the sight point thereof, at which no obstacle is positioned.

5. The computer-readable storage medium having stored therein the game program according to claim 2, wherein the sight point is a predetermined point included in a player object representing a subject to be operated by a player.

6. The computer-readable storage medium having stored therein the game program according to claim 5,
  wherein the game program causes the computer to further function as a distance difference calculator for calculating, in the three-dimensional game space, a difference between a distance from the point of view of the virtual camera to the predetermined point included in the player object, and a distance from the point of view of the virtual camera to the obstacle positioned in a direction of the predetermined point included in the player object, and
  wherein the obstacle determination programmed logic circuitry determines that the obstacle is positioned when the difference calculated by the distance difference calculator represents a value greater than or equal to a predetermined value.

7. The computer-readable storage medium having stored therein the game program according to claim 1, wherein the movement rate setter sets the movement rate such that the greater the number of pixels calculated by the-number-of-pixels calculator is, the higher the movement rate is.

8. The computer-readable storage medium having stored therein the game program according to claim 7,
  wherein the movement rate setter includes an acceleration calculator for calculating a movement acceleration of the virtual camera in accordance with the number of pixels calculated by the-number-of-pixels calculator, and
  wherein the movement rate is calculated and set by using the movement acceleration.

9. The computer-readable storage medium having stored therein the game program according to claim 8,
  wherein the game program causes the computer to further function as:
  a-number-of-pixels-to-be-returned calculator for calculating a number of pixels included in a linear distance from the sight point pixel to a predetermined pixel, representing a return pixel, on the two-dimensional game image after the virtual camera has been moved by the camera movement controller in accordance with the movement rate based on the movement acceleration, and stops; and
  a camera returning controller for moving, when the number of pixels calculated by the-number-of-pixels-to-be-returned calculator represents a value greater than or equal to a predetermined value, the virtual camera at a predetermined movement rate in a direction opposite to a moving direction in which the camera movement controller has moved the virtual camera.

10. The computer-readable storage medium having stored therein the game program according to claim 9, wherein the camera returning controller moves the virtual camera such that the greater the number of pixels calculated by the-number-of-pixels-to-be-returned calculator is, the higher the predetermined movement rate for moving the virtual camera is.

11. The computer-readable storage medium having stored therein the game program according to claim 10,
  wherein the camera returning controller includes a returning acceleration calculator for calculating a movement acceleration of the virtual camera in accordance with the number of pixels calculated by the-number-of-pixels-to-be-returned calculator, and
  wherein the virtual camera is moved at the movement rate based on the movement acceleration.

12. The computer-readable storage medium having stored therein the game program according to claim 1,
  wherein the game program causes the computer to further function as:
  depth value storage programmed logic circuitry for storing, in a predetermined storage section, a depth value representing a distance of an object displayed on the two-dimensional game image in a depth direction of the three-dimensional game space so as to associate a plurality of the depth values with pixels of the two-dimensional game image, respectively;
  a sight point depth value calculator for calculating a depth value of the sight point of the virtual camera in the three-dimensional game space; and
  a target pixel detector for comparing the depth value calculated by the sight point depth value calculator with the depth value representing the distance of the object displayed on the two-dimensional game image so as to detect a position of the target pixel in accordance with a comparison result.

13. The computer-readable storage medium having stored therein the game program according to claim 12, wherein the camera movement controller moves the virtual camera, in the three-dimensional game space, to a position, on a straight line connecting between a point of view of the virtual camera and the sight point thereof, at which no obstacle is positioned.

14. The computer-readable storage medium having stored therein the game program according to claim 12, wherein the sight point is a predetermined point included in a player object representing a subject to be operated by a player.

15. The computer-readable storage medium having stored therein the game program according to claim 14,
  wherein the game program causes the computer to further function as a distance difference calculator for calculating, in the three-dimensional game space, a difference between a distance from the point of view of the virtual camera to the predetermined point included in the player object, and a distance from the point of view of the virtual camera to the obstacle positioned in a direction of the predetermined point included in the player object, and
  wherein the obstacle determination programmed logic circuitry determines that the obstacle is positioned when the difference calculated by the distance difference calculator represents a value greater than or equal to a predetermined value.

16. The computer-readable storage medium having stored therein the game program according to claim 12,
  wherein the game program causes the computer to further function as:
  a projection position calculator for calculating a display position at which the player object is to be displayed in a coordinate system of the two-dimensional game image by using projective transformation; and
  a depth value difference calculator for calculating a difference between the depth value calculated by the sight point depth value calculator and a depth value of a pixel corresponding to a projection position, and wherein the obstacle determination programmed logic circuitry determines that the obstacle is positioned when the difference calculated by the depth value difference calculator represents a value greater than or equal to a predetermined value.

17. The computer-readable storage medium having stored therein the game program according to claim 12, wherein the target pixel detector detects a position of a pixel at which the depth value representing the distance of the object displayed on the two-dimensional game image represents a deeper position than the depth value calculated by the sight point depth value calculator.

18. The computer-readable storage medium having stored therein the game program according to claim 1, wherein the camera movement controller causes the virtual camera to rotate with respect to the sight point.

19. A game apparatus for generating a two-dimensional game image representing a state of a three-dimensional game space acquired by a virtual camera so as to display the two-dimensional game image by a display device, the game apparatus comprising:

a sight point calculator for calculating a sight point pixel representing a pixel on the two-dimensional game image, the sight point pixel corresponding to a sight point of the virtual camera in the three-dimensional game space;

a camera movement controller for moving the virtual camera in the three-dimensional game space in accordance with a direction from the sight point pixel on the two-dimensional game image to a target pixel representing a predetermined pixel;

a number-of-pixels calculator for calculating a number of pixels included in a linear distance to the target pixel from the sight point pixel; and a movement rate setter for setting a movement rate of the virtual camera in accordance with the number of pixels calculated by the number-of-pixels calculator, wherein the camera movement controller moves the virtual camera in accordance with the movement rate having been set by the movement rate setter.

\* \* \* \* \*